Aug. 24, 1954

A. B. CROWELL 2,687,087

RECORD CONTROLLED PRINTING MACHINE

Filed May 22, 1951

INVENTOR.
ARNOLD B. CROWELL
BY
William Lang
ATTORNEY

Aug. 24, 1954   A. B. CROWELL   2,687,087
RECORD CONTROLLED PRINTING MACHINE
Filed May 22, 1951   23 Sheets-Sheet 2
FIG.3
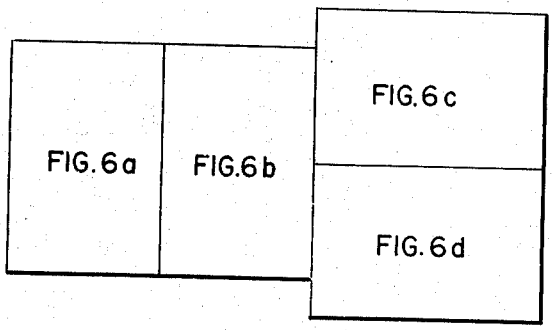
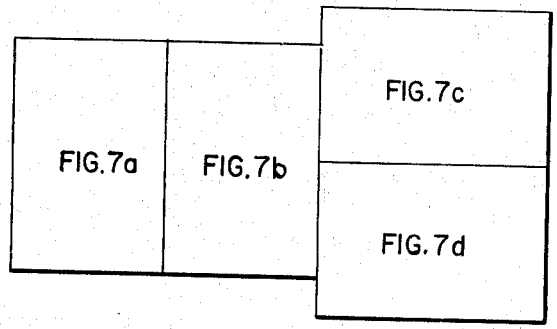
INVENTOR.
ARNOLD B. CROWELL
BY
William Lang
ATTORNEY

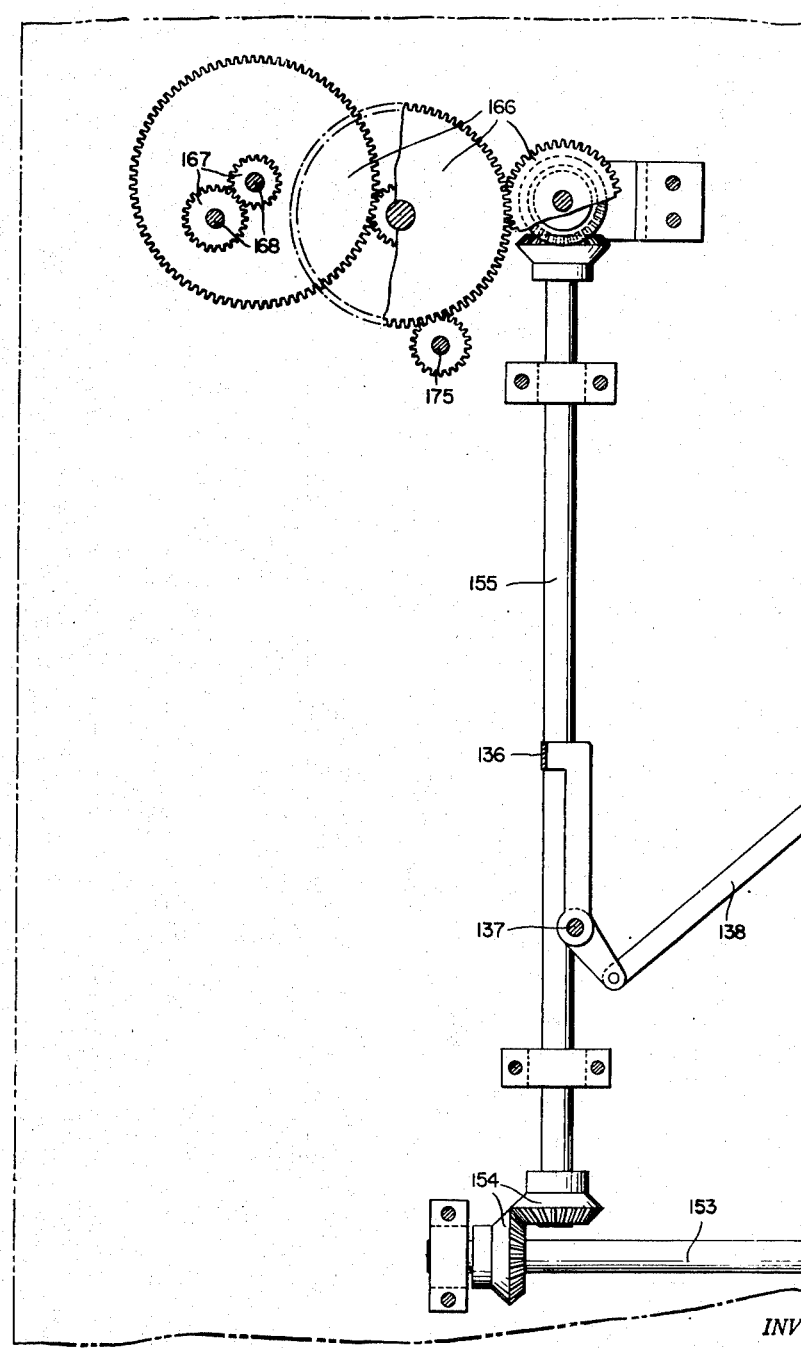

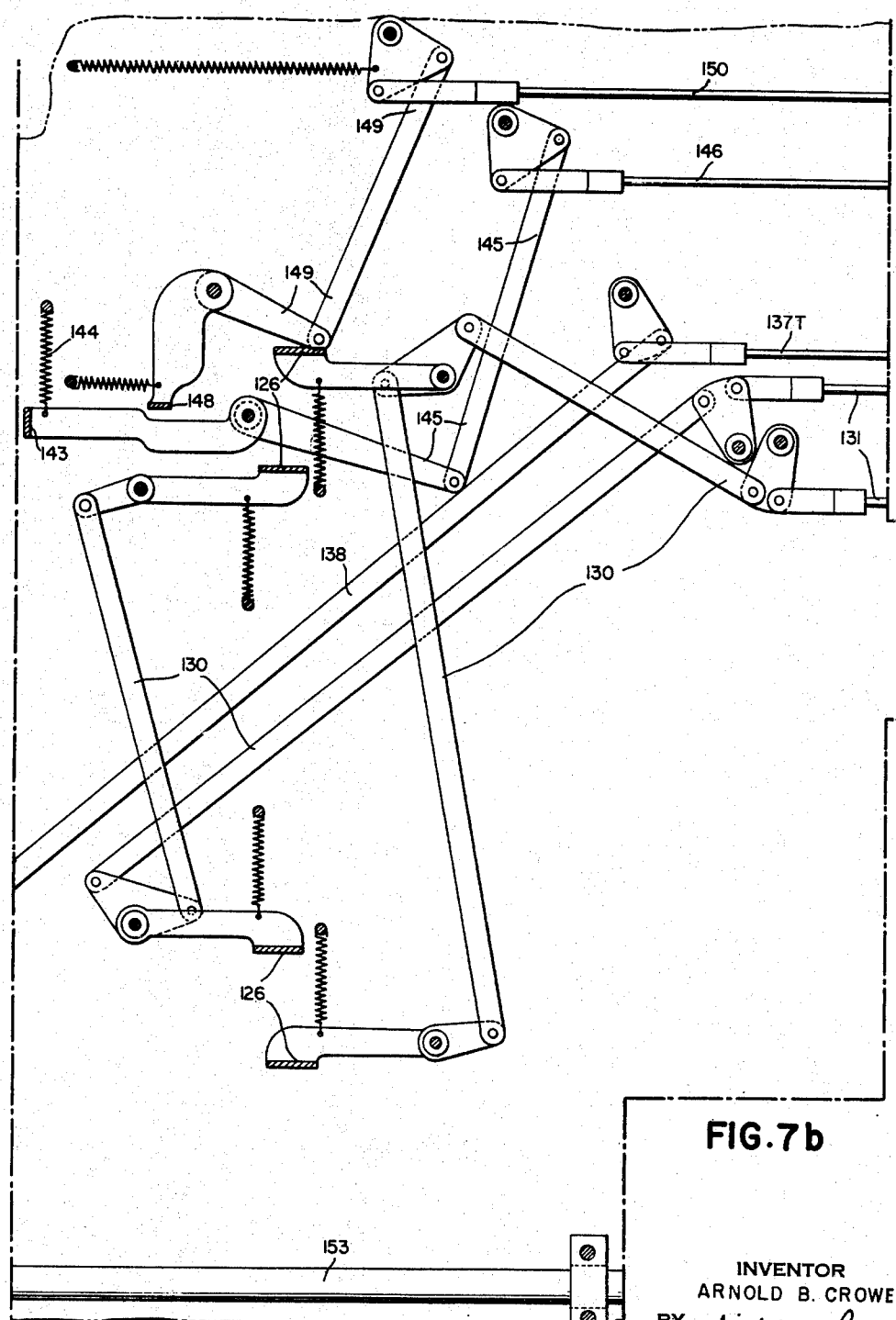

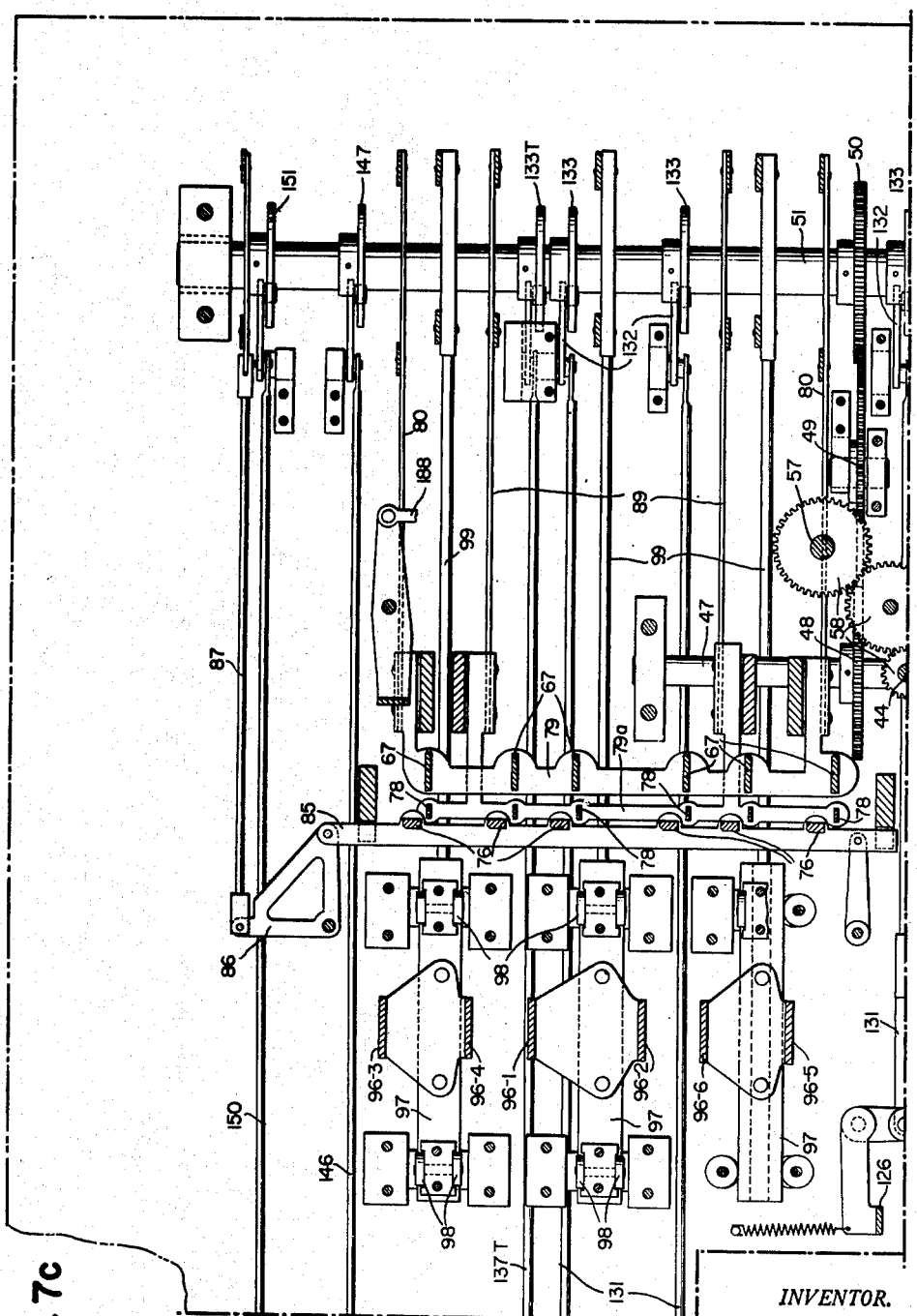

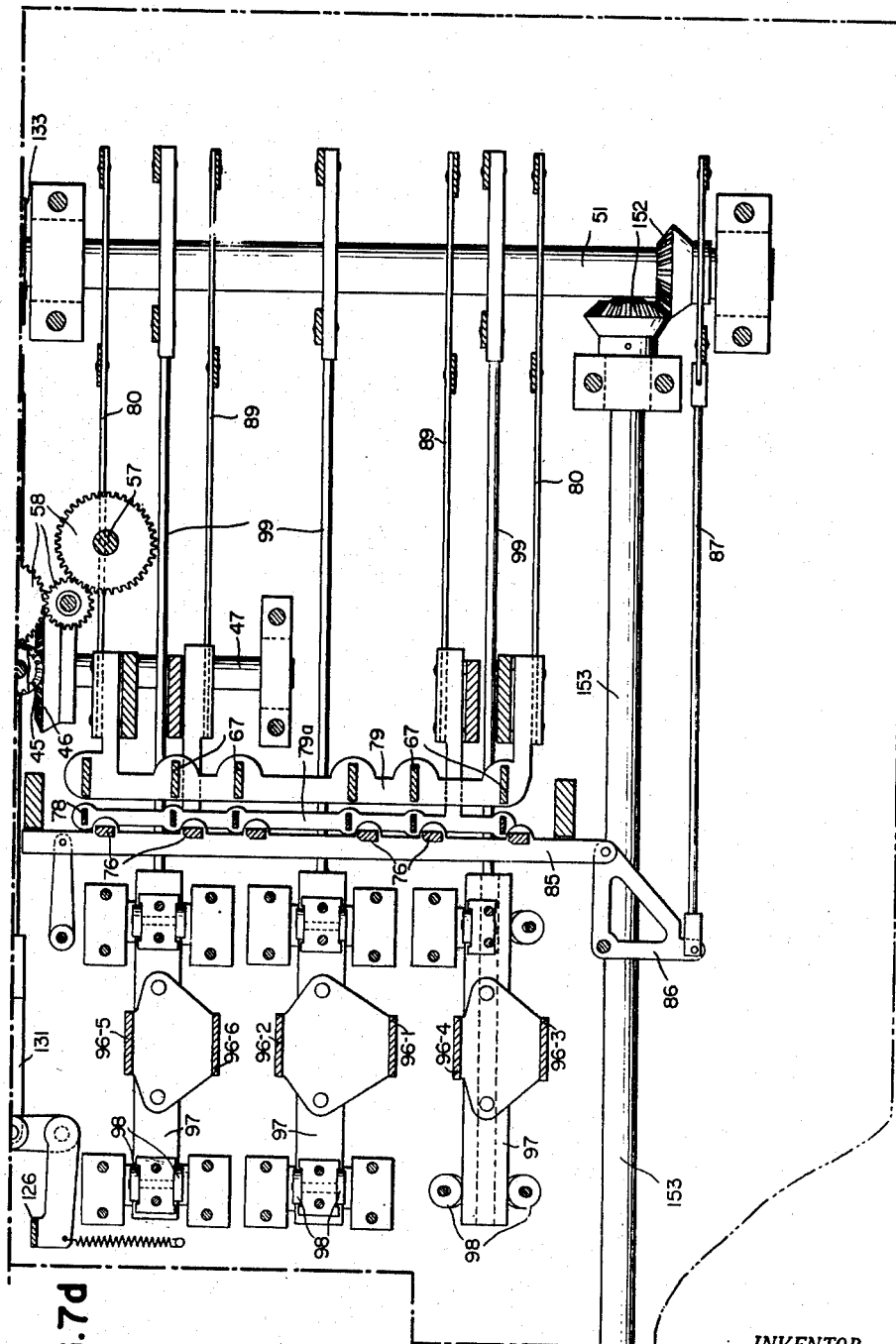

Aug. 24, 1954   A. B. CROWELL   2,687,087
RECORD CONTROLLED PRINTING MACHINE
Filed May 22, 1951   23 Sheets-Sheet 12

INVENTOR.
ARNOLD B. CROWELL
BY
William Lang
ATTORNEY

INVENTOR.
ARNOLD B. CROWELL
BY
ATTORNEY

Aug. 24, 1954 A. B. CROWELL 2,687,087
RECORD CONTROLLED PRINTING MACHINE
Filed May 22, 1951 23 Sheets-Sheet 14

INVENTOR.
ARNOLD B. CROWELL
BY
William Lang
ATTORNEY

Aug. 24, 1954          A. B. CROWELL          2,687,087
RECORD CONTROLLED PRINTING MACHINE
Filed May 22, 1951                           23 Sheets-Sheet 16

| TYPE | TYPE BAR | SETTING | INTERPOSERS 1 (-13) | 2 (+26) | 3 (-1) | 4 (+2) | 5 (+3) | 6 (-6) | CARD CODE 9 | 8 | 7 | 6 | 5 | 4 | 3 | 2 | 1 | 0 | 11 | 12 |
|---|---|---|---|---|---|---|---|---|---|---|---|---|---|---|---|---|---|---|---|---|
| AUTO * | | +31 | | | | | | | | | | | | | | | | | | |
| N | | +30 | | +26 | -1 | +2 | +3 | | | | | | 5 | | | | | | | 11 |
| M | | +29 | | +26 | | | +3 | | | | | | | 4 | | | | | | 11 |
| K | | +28 | | +26 | | +2 | | | | | | | | | 2 | | | | | 11 |
| L | | +27 | | +26 | -1 | +2 | | | | | | | | | | 3 | | | | 11 |
| – | | +26 | | +26 | | | | | | | | | | | | | | | | 11 |
| J | | +25 | | +26 | -1 | | | | | | | | | | | | | 1 | | 11 |
| O | | +24 | | +26 | -1 | +2 | +3 | -6 | | | | 6 | | | | | | | | 11 |
| * | | +23 | | +26 | | | +3 | -6 | | 8 | | | | 4 | | | | | | 11 |
| R | | +22 | | +26 | | +2 | | -6 | 9 | | | | | | | 3 | | | | 11 |
| S | | +21 | | +26 | -1 | +2 | | -6 | | 8 | | | | | | | | | | 11 |
| Q | | +20 | | +26 | | | | -6 | | 8 | | | | | | | | | | 11 |
| P | | +19 | | +26 | -1 | | | -6 | | | 7 | | | | | | | | | 11 |
| AUTO * | | +18 | | | | | | | | | | | | | | | | | | |
| E | | +17 | | -13 | +26 | -1 | +2 | +3 | | | | | | 5 | | | | | | | 12 |
| D | | +16 | | -13 | +26 | | | +3 | | | | | | | 4 | | | | | | 12 |
| B | | +15 | | -13 | +26 | | +2 | | | | | | | | | 2 | | | | | 12 |
| C | | +14 | | -13 | +26 | -1 | +2 | | | | | | | | | | 3 | | | | 12 |
| & | | +13 | | -13 | +26 | | | | | | | | | | | | | | | | 12 |
| A | | +12 | | -13 | +26 | -1 | | | | | | | | | | | | 1 | | | 12 |
| F | | +11 | | -13 | +26 | -1 | +2 | +3 | -6 | | | 6 | | | | | | | | | 12 |
| ¤ | | +10 | | -13 | +26 | | | +3 | -6 | | 8 | | | | 4 | | | | | | 12 |
| I | | +9 | | -13 | +26 | | +2 | | -6 | 9 | | | | | | | | | | | 12 |
| . | | +8 | | -13 | +26 | -1 | +2 | | -6 | | 8 | | | | | | 3 | | | | 12 |
| H | | +7 | | -13 | +26 | | | | -6 | | 8 | | | | | | | | | | 12 |
| G | | +6 | | -13 | +26 | -1 | | | -6 | | | 7 | | | | | | | | | 12 |
| BLANK | | +5 | | | | | | | | | | | | | | | | | | |
| 5 | | +4 | | | | -1 | +2 | +3 | | | | | | 5 | | | | | | | |
| 4 | | +3 | | | | | | +3 | | | | | | | 4 | | | | | | |
| 2 | | +2 | | | | | +2 | | | | | | | | | 2 | | | | | |
| 3 | | +1 | | | | -1 | +2 | | | | | | | | | | 3 | | | | |
| HOME | | BLANK | | | | | | | | | | | | | | | | | | |
| 1 | | -1 | | | | -1 | | | | | | | | | | | | 1 | | | |
| 6 | | -2 | | | | -1 | +2 | +3 | -6 | | | 6 | | | | | | | | | |
| @ | | -3 | | | | | | +3 | -6 | | 8 | | | | 4 | | | | | | |
| 9 | | -4 | | | | | +2 | | -6 | 9 | | | | | | | | | | | |
| # | | -5 | | | | -1 | +2 | | -6 | | 8 | | | | | | 3 | | | | |
| 8 | | -6 | | | | | | | -6 | | 8 | | | | | | | | | | |
| 7 | | -7 | | | | -1 | | | -6 | | | 7 | | | | | | | | | |
| BLANK | | -8 | | | | | | | | | | | | | | | | | | |
| V | | -9 | | -13 | | -1 | +2 | +3 | | | | | | 5 | | | | | | 0 | |
| U | | -10 | | -13 | | | | +3 | | | | | | | 4 | | | | | 0 | |
| S | | -11 | | -13 | | | +2 | | | | | | | | | 2 | | | | 0 | |
| T | | -12 | | -13 | | -1 | +2 | | | | | | | | | | 3 | | | 0 | |
| ZERO 0 | | -13 | | -13 | | | | | | | | | | | | | | | | 0 | |
| / | | -14 | | -13 | | -1 | | | | | | | | | | | | 1 | | 0 | |
| W | | -15 | | -13 | | -1 | +2 | +3 | -6 | | | 6 | | | | | | | | 0 | |
| % | | -16 | | -13 | | | | +3 | -6 | | 8 | | | | 4 | | | | | 0 | |
| Z | | -17 | | -13 | | | +2 | | -6 | 9 | | | | | | | | | | 0 | |
| , | | -18 | | -13 | | -1 | +2 | | -6 | | 8 | | | | | | 3 | | | 0 | |
| Y | | -19 | | -13 | | | | | -6 | | 8 | | | | | | | | | 0 | |
| X | | -20 | | -13 | | -1 | | | -6 | | | 7 | | | | | | | | 0 | |

FIG. 17

INVENTOR.
ARNOLD B. CROWELL
BY
William Lang
ATTORNEY

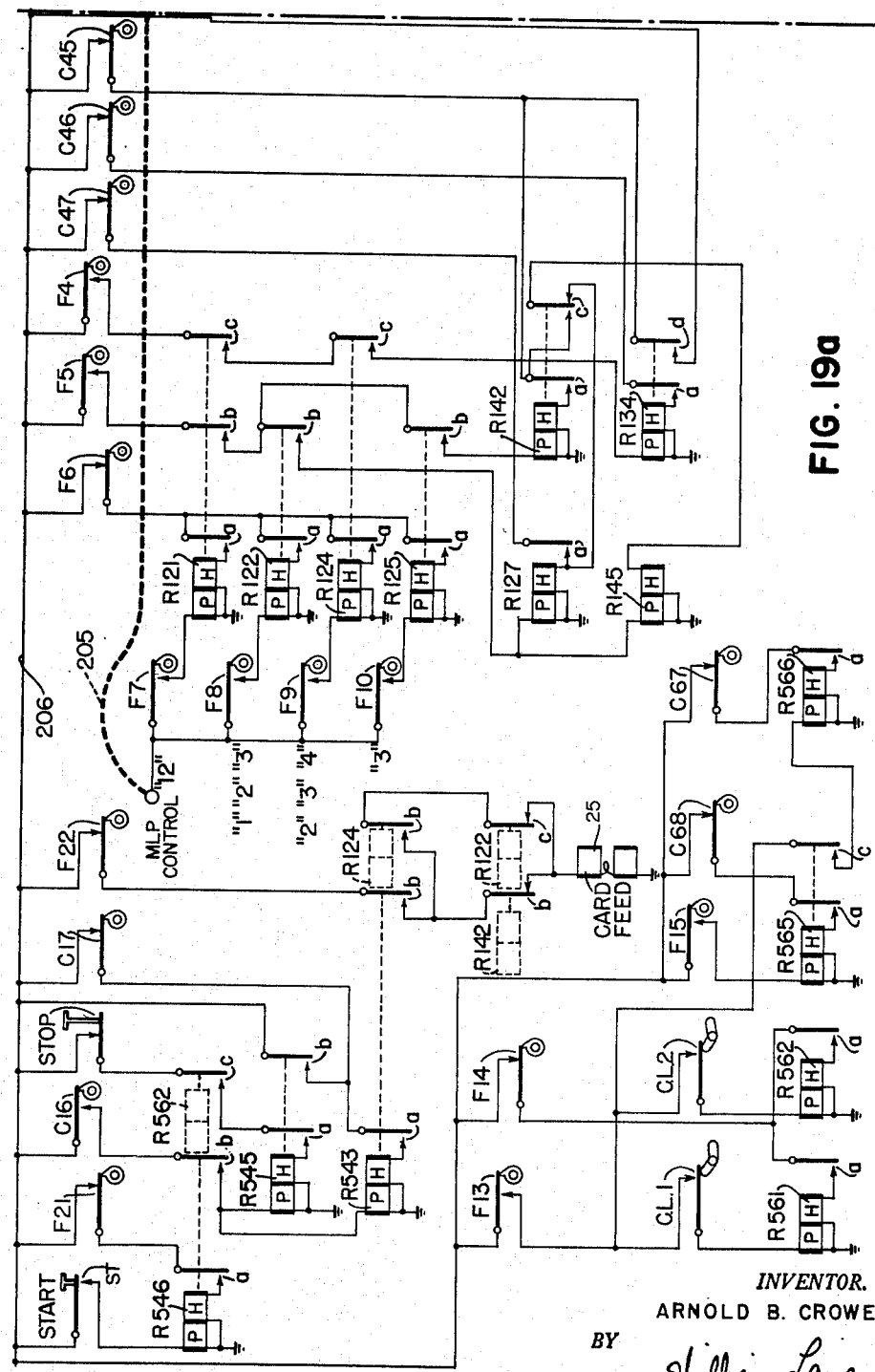

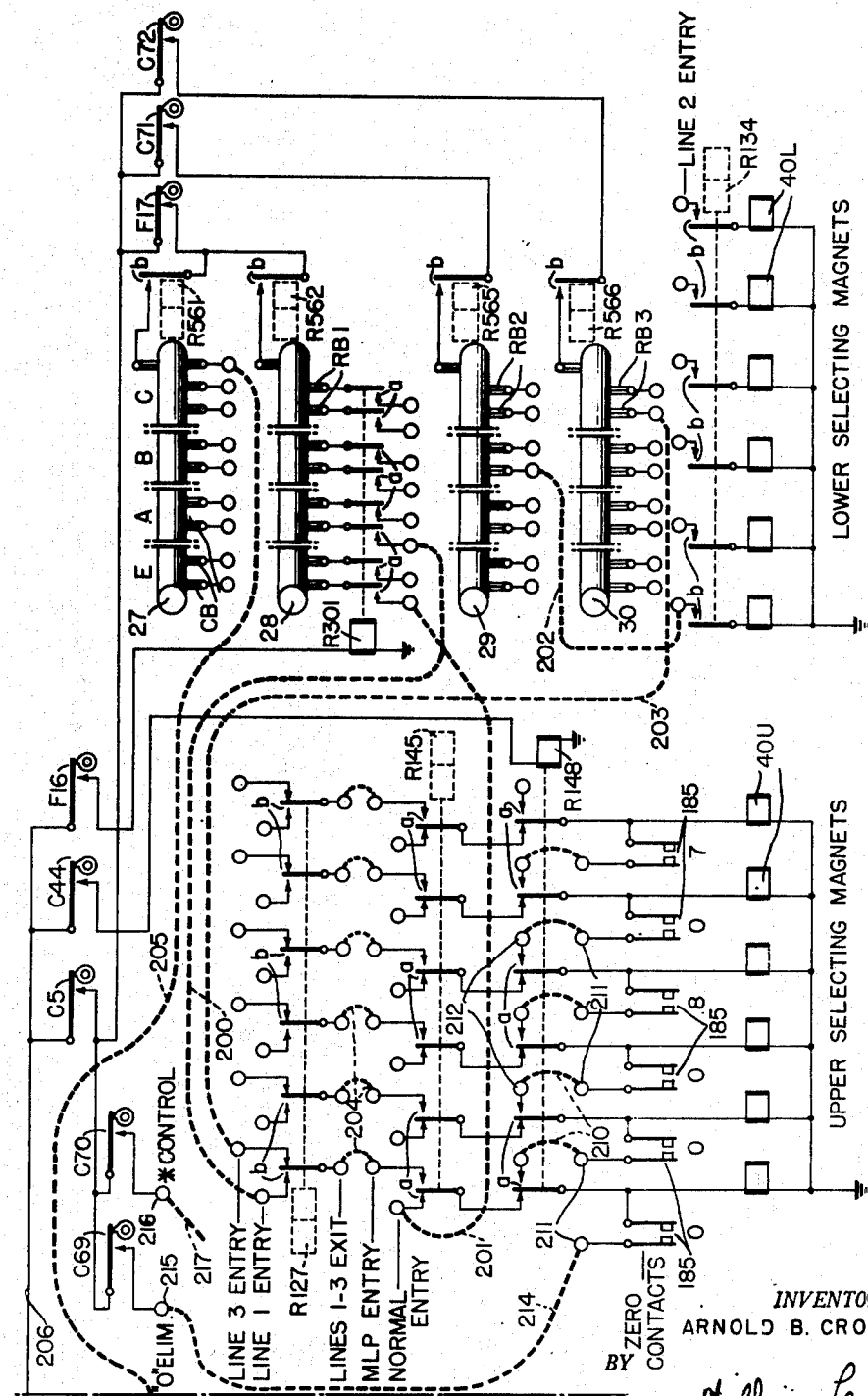

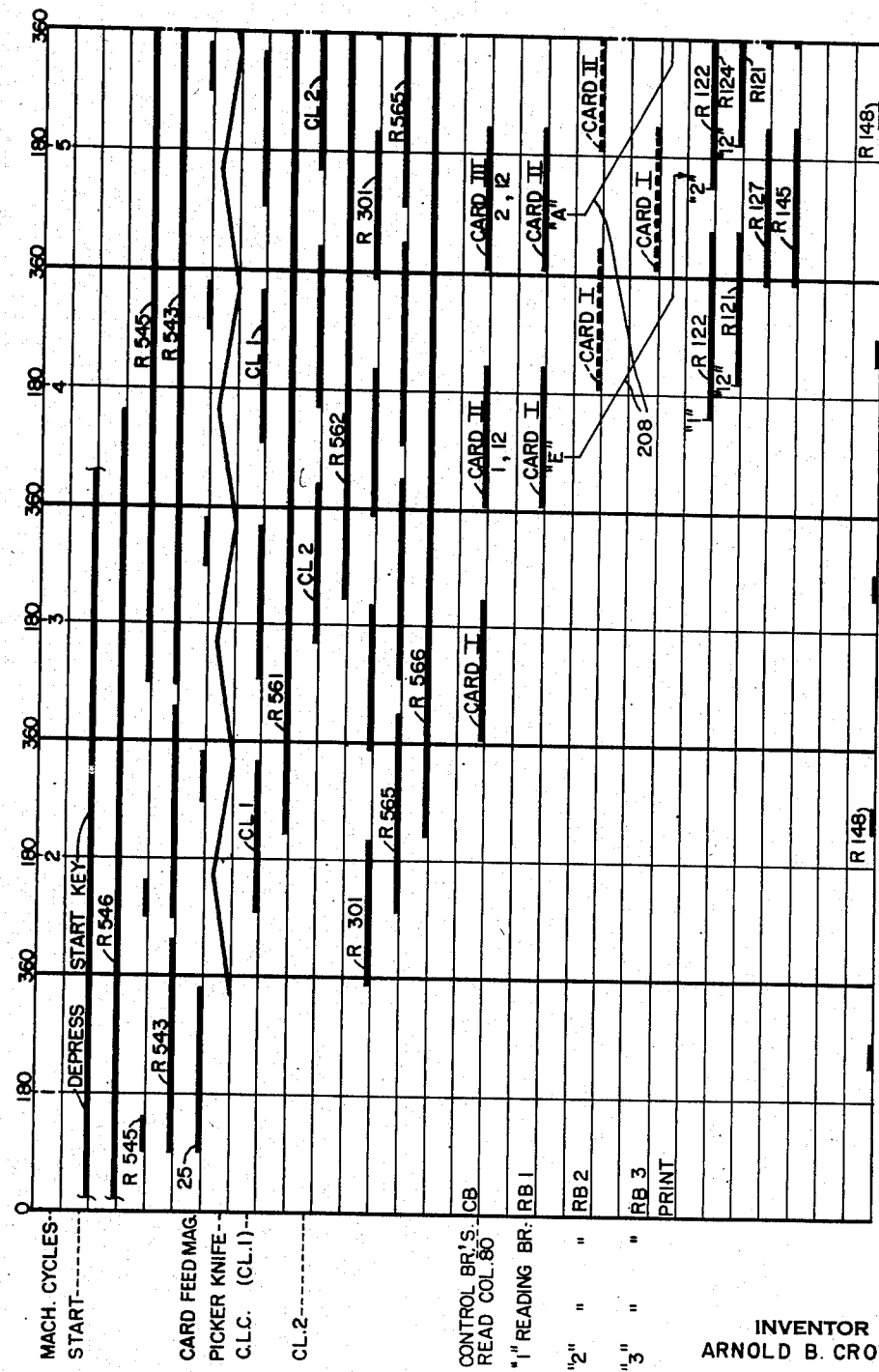

Aug. 24, 1954  A. B. CROWELL  2,687,087
RECORD CONTROLLED PRINTING MACHINE
Filed May 22, 1951  23 Sheets-Sheet 21

FIG.20b

*INVENTOR.*
ARNOLD B. CROWELL
BY
William Lang
ATTORNEY

Aug. 24, 1954     A. B. CROWELL     2,687,087
RECORD CONTROLLED PRINTING MACHINE
Filed May 22, 1951     23 Sheets-Sheet 22
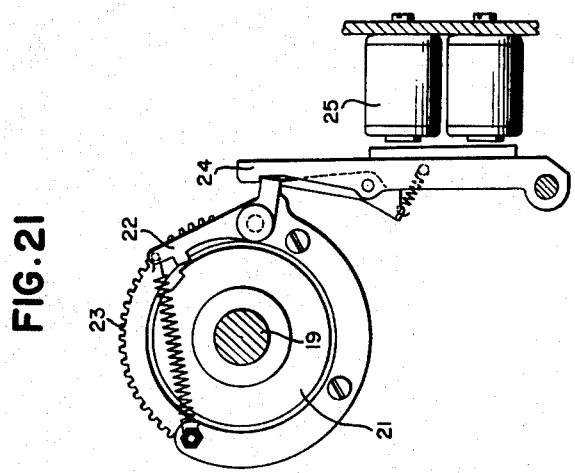
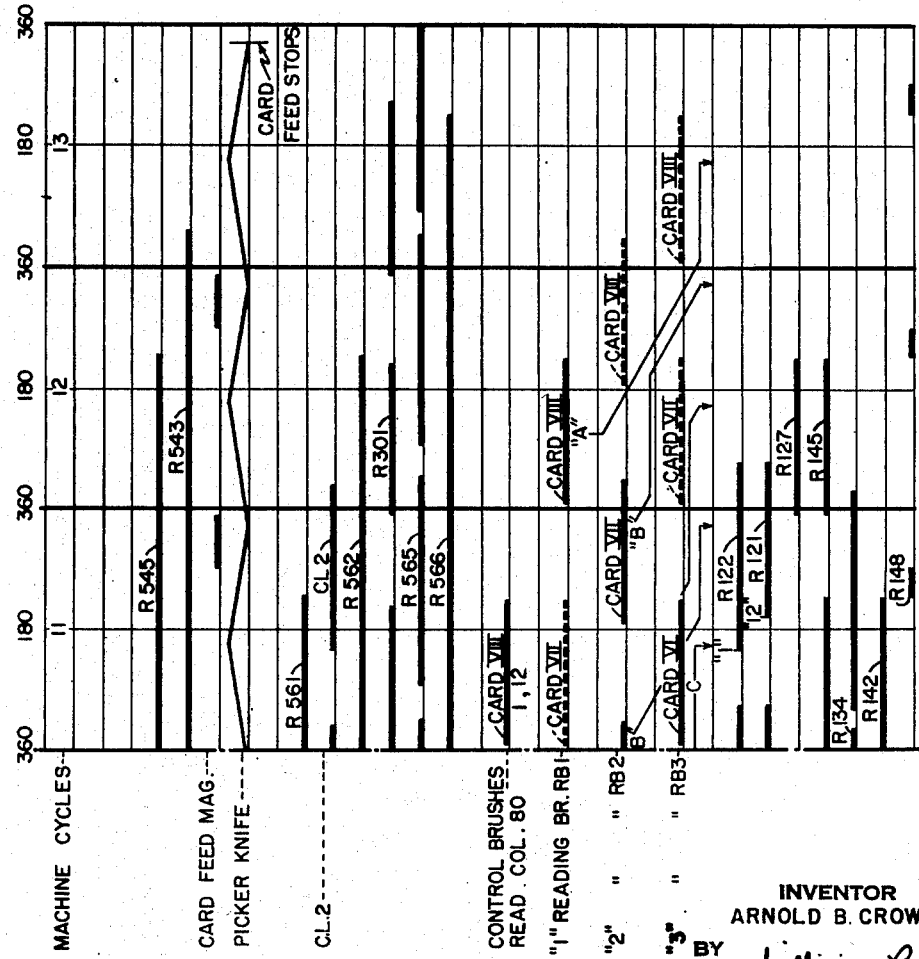
INVENTOR
ARNOLD B. CROWELL
BY
William Lang
ATTORNEY Aug. 24, 1954 A. B. CROWELL 2,687,087
RECORD CONTROLLED PRINTING MACHINE
Filed May 22, 1951 23 Sheets-Sheet 23

INVENTOR.
ARNOLD B. CROWELL
BY William Lang
ATTORNEY

Patented Aug. 24, 1954

2,687,087

UNITED STATES PATENT OFFICE 2,687,087

RECORD CONTROLLED PRINTING MACHINE

Arnold B. Crowell, Endicott, N. Y., assignor to International Business Machines Corporation, New York, N. Y., a corporation of New York Application May 22, 1951, Serial No. 227,671

4 Claims. (Cl. 101—93)

The present invention concerns printing mechanism and more particularly printing mechanism in which a reciprocating type bar or carrier is employed.

The principal object of the invention is to provide a type carrier with dual control mechanisms operable in alternation. Both control mechanisms are separately settable, each in representation of any of a group of characters to be printed and cyclically operable controls render the mechanisms effective in successive alternation, to cause each to position the carrier in accordance with its setting.

A specific object of the invention is to provide differential devices intermediate the type carrier and the dual settable control mechanisms, through which both settings are transmitted to the carrier in a manner to cause each setting to occur as the carrier is returned from a prior setting. The result of such action is to move the carrier directly from one position to the next and, in the specific case where a character is repeated, the carrier remains in position without movement.

The type bar or carrier of the present invention is arranged to occupy a normal home or rest position with part of its printing elements to one side or above a printing line, and the remainder to the other side or below the printing line. The type bar has gear connection with a compound differential operating mechanism in which three elements are selectively positionable different extents in either of two directions, to effect a displacement of the type bar in either direction an extent proportional to the algebraic sum of the movements of the elements. A second positioning mechanism comprising a second compound differential device similar to the first is provided to effect alternate positioning of the type bar by the two differential operating mechanisms.

Record controlled mechanism is provided for effecting a setting of the first differential operating mechanism through what may be termed a selector mechanism. In the operation of the machine, the selector mechanism is first set to represent a character to be printed, after which this setting is transferred to the three elements of the differential setting mechanism through which the type bar is positioned. While the type bar positioning takes place, the selector mechanism may be restored in readiness to and will receive a new setting. This provides an overlap in operation whereby, as the actual type bar setting is made in response to one record, a setting may be made in response to the reading of another record.

In copending application Serial No. 227,672, filed May 22, 1951, there is shown and claimed mechanism for carrying out the objects of this invention as applied to a record controlled system, while the broader aspects are claimed in the present application.

Other objects of the invention will be pointed out in the following description and claims and illustrated in the accompanying drawings, which disclose, by way of example, the principle of the invention and the best mode, which has been contemplated, of applying that principle.

In the drawings:

Fig. 3 represents a record card of the well known IBM type showing character receiving columns in which, for purposes of explanation, the well known coding arrangement for the digits, alphabetic and special characters is illustrated.

Fig. 4 is a diagram showing the manner in which

Fig. 5 is a similar diagram showing the manner in which Figs. 7a to 7d are to be arranged to constitute a complete view.

Figs. 6a to 6d, when arranged in the order indicated in Fig. 4, comprise a central section through a printing mechanism showing the control mechanism for a single type bar.

Figs. 7a to 7d, when arranged in the order indicated in Fig. 5 constitute a view looking in the the same direction as Figs. 6a to 6d showing some of the operating linkage and drive.

Figure 6A:
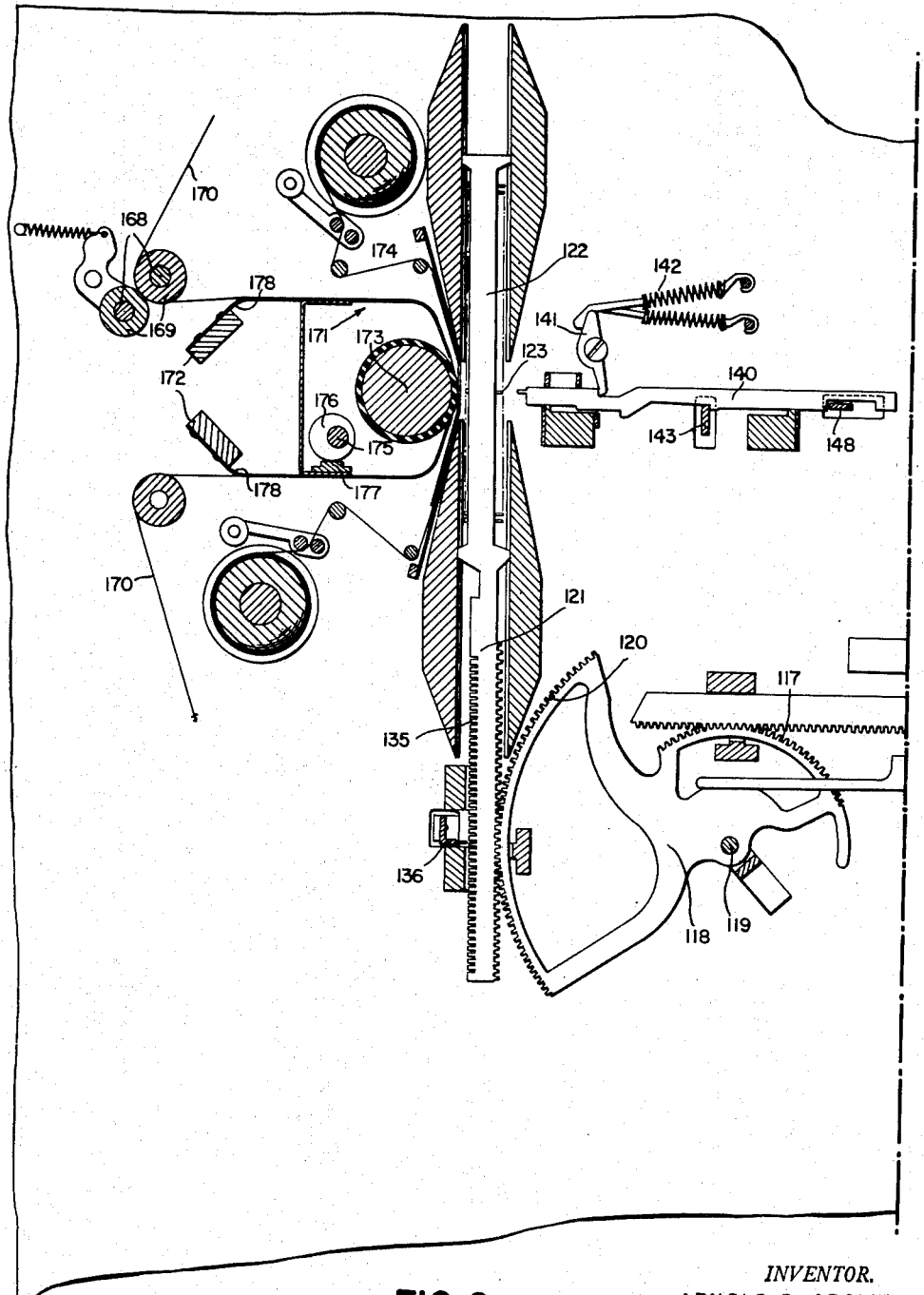
Figs. 6a to 6d are to be arranged to constitute a complete view.
Figure 6B:
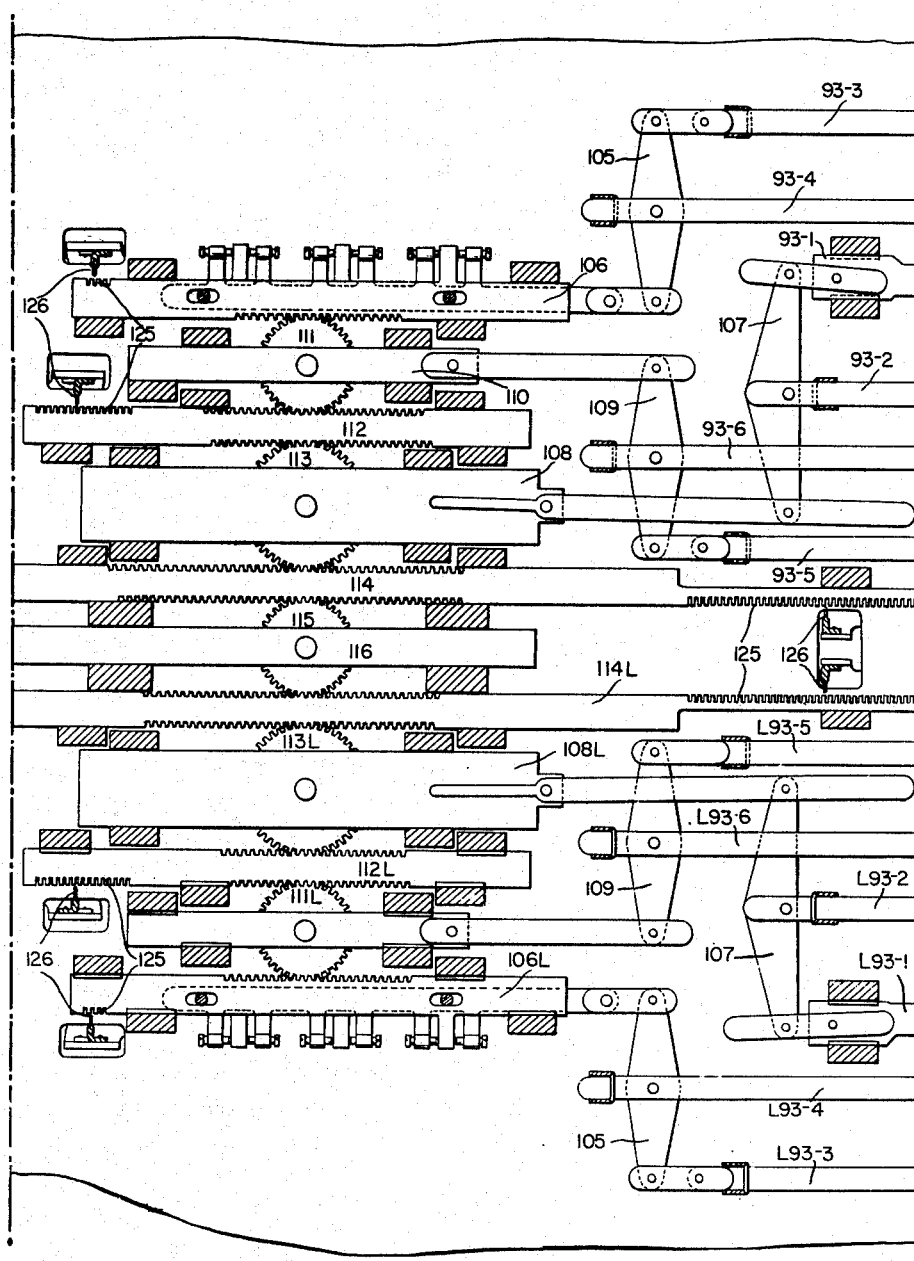
Figure 6C:
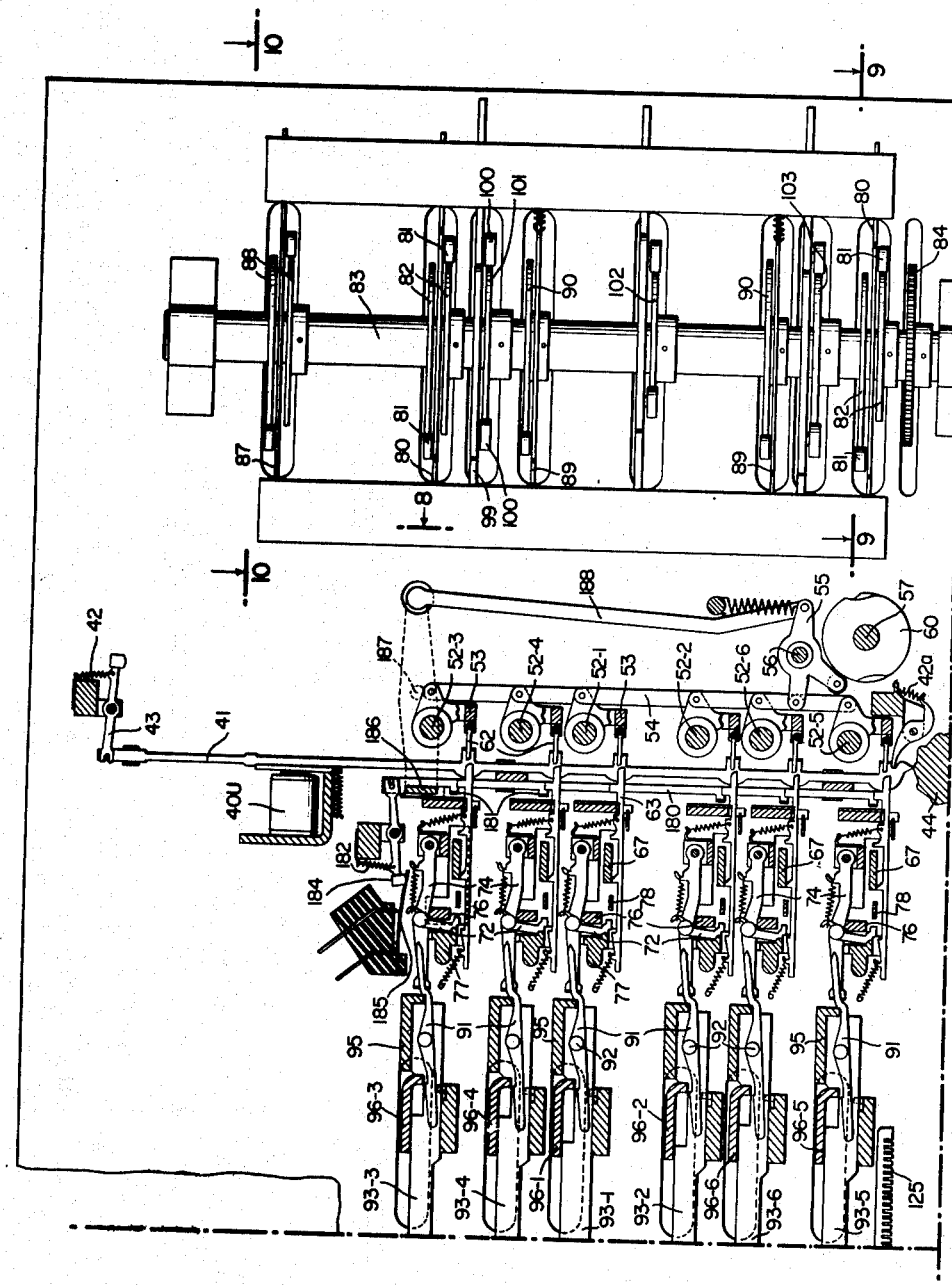
Figure 6D:
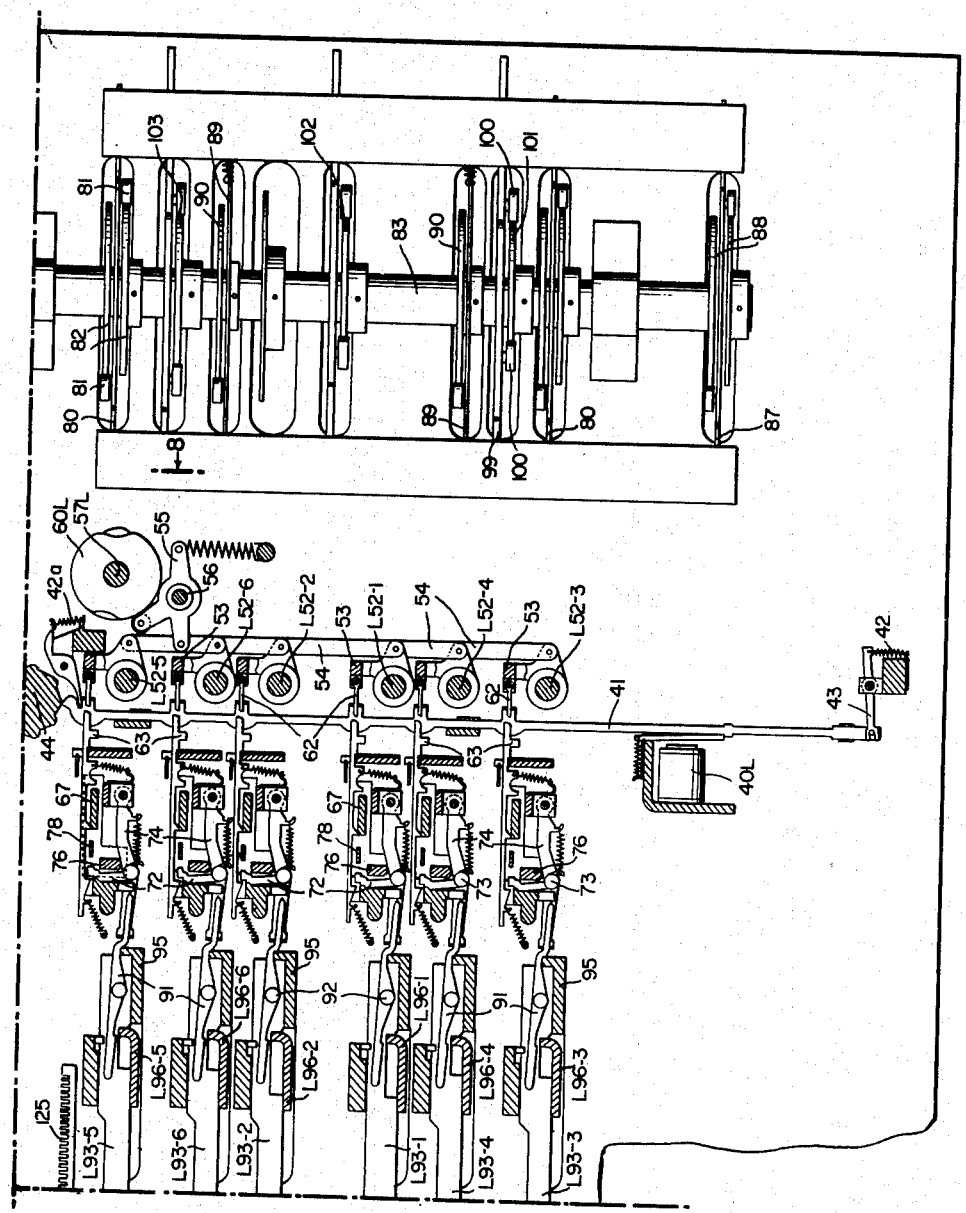
Figure 8:
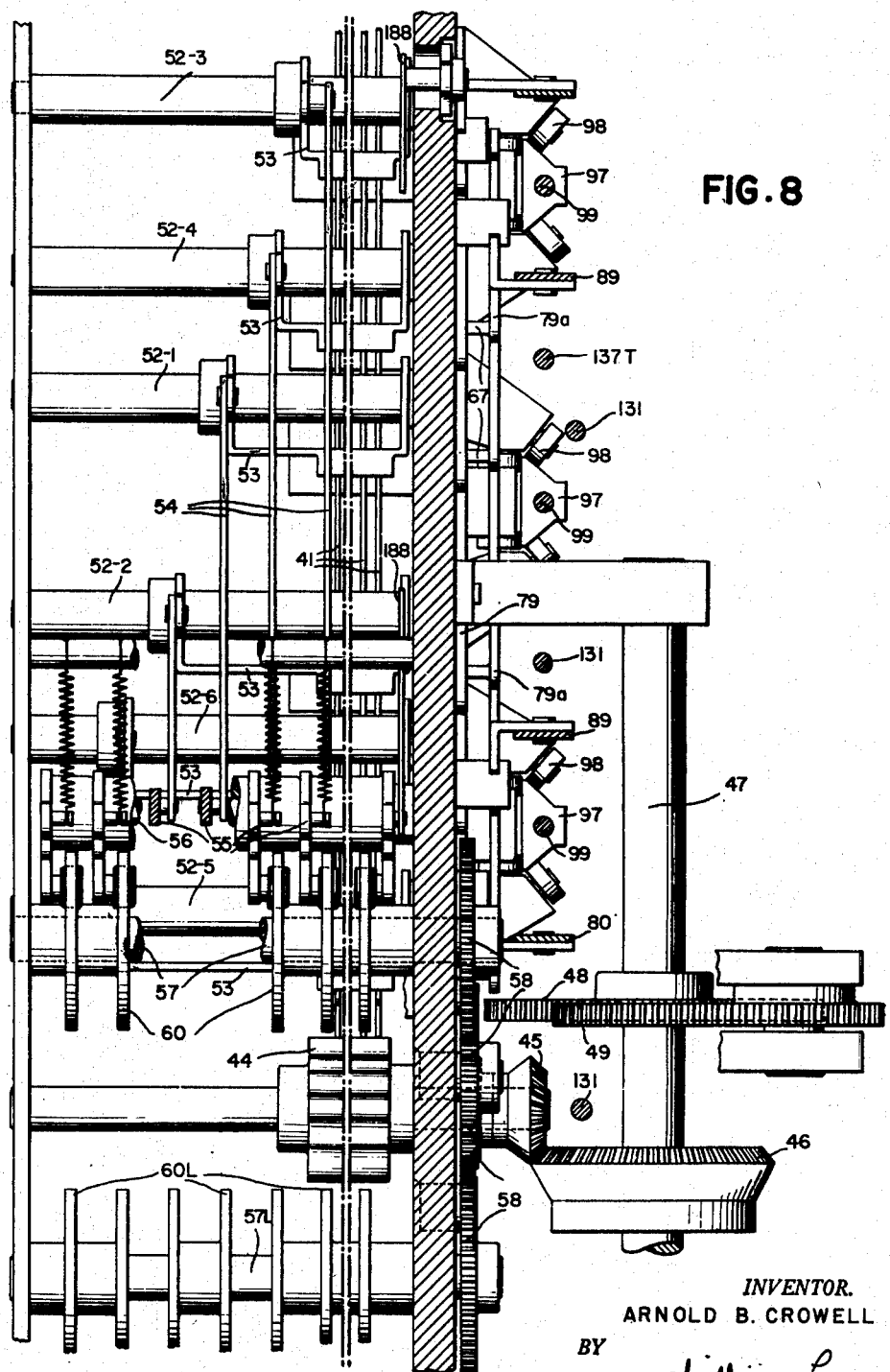

Fig. 8 is a section taken on lines 8—8 of Fig. 6c, 6d showing further details of the operating mechanism.

Figure 9:
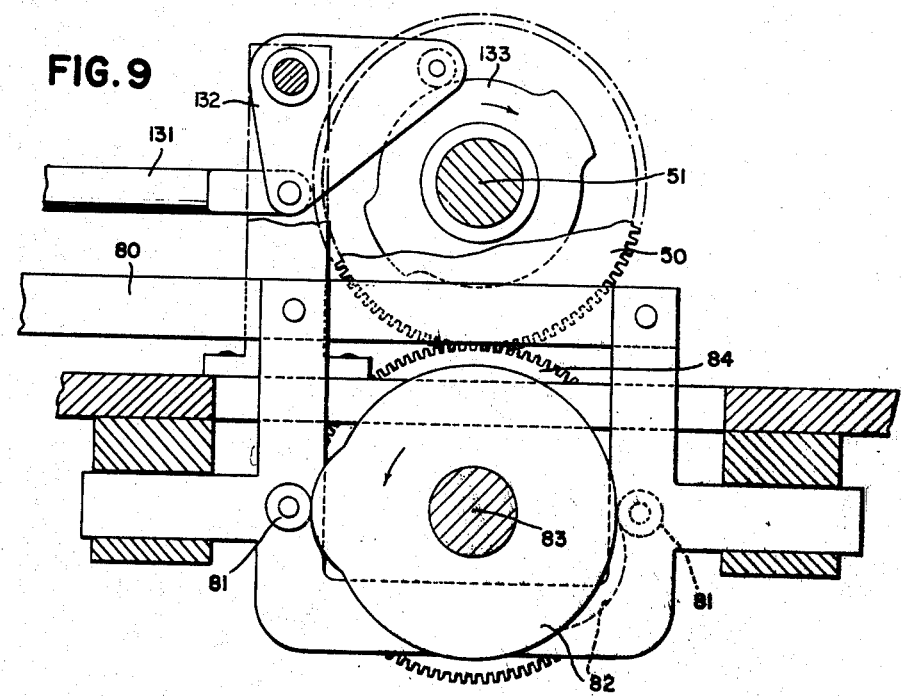
Figure 10:
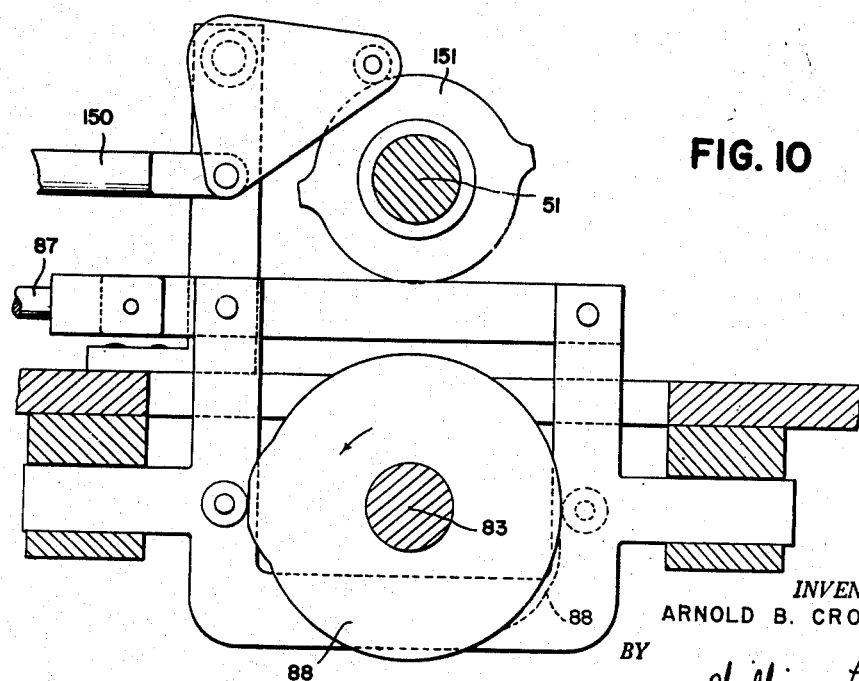

Figs. 9 and 10 are sectional views looking in the direction of lines 9—9 and 10—10 respectively of Fig. 6c.

Figs. 11, 12, 13 and 14 are enlarged views of one unit of the selector mechanism of Fig. 6c shown in various operating positions.

Figure 15:
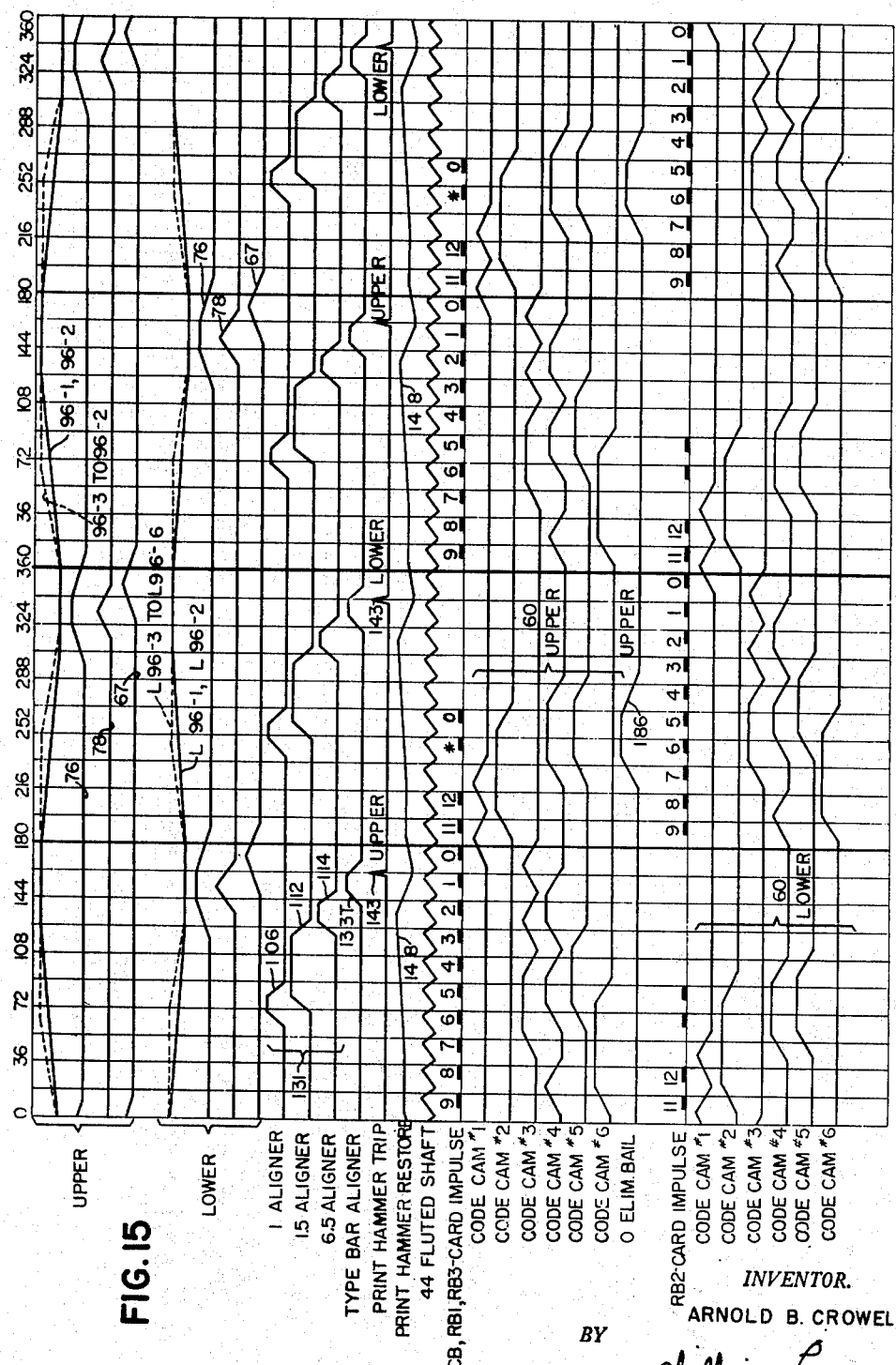

Fig. 15 is a timing chart showing the time of operation of the mechanical devices of the machine and extends across two cycles.

Figure 16:
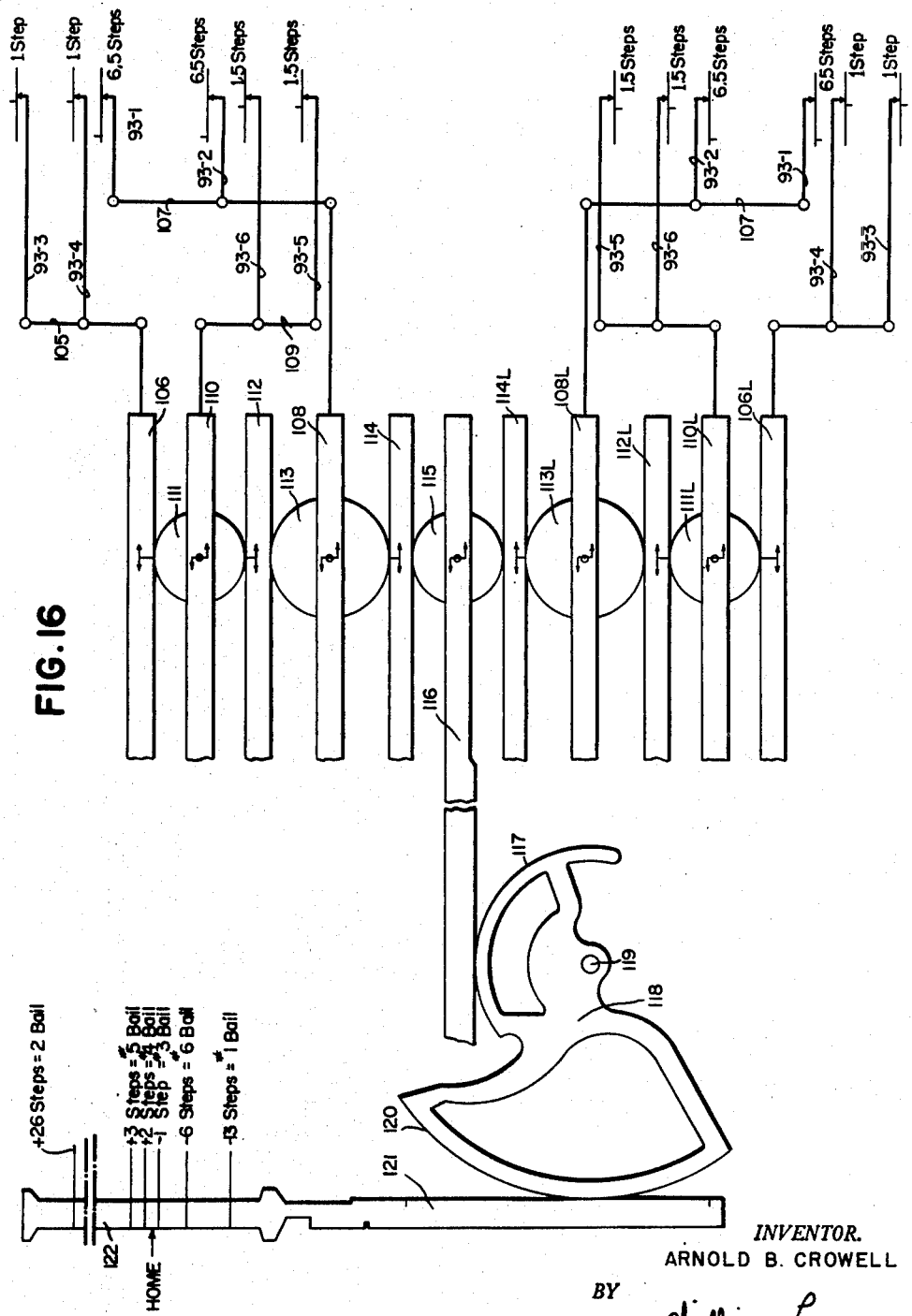

Fig. 16 is a schematic diagram of the differential control mechanism to illustrate its principal of operation.

Fig. 17 is a chart showing the location of the several character printing elements on the type bar, the controlling interposers and the record card perforating code related to each character and interposer group.

Figure 18:
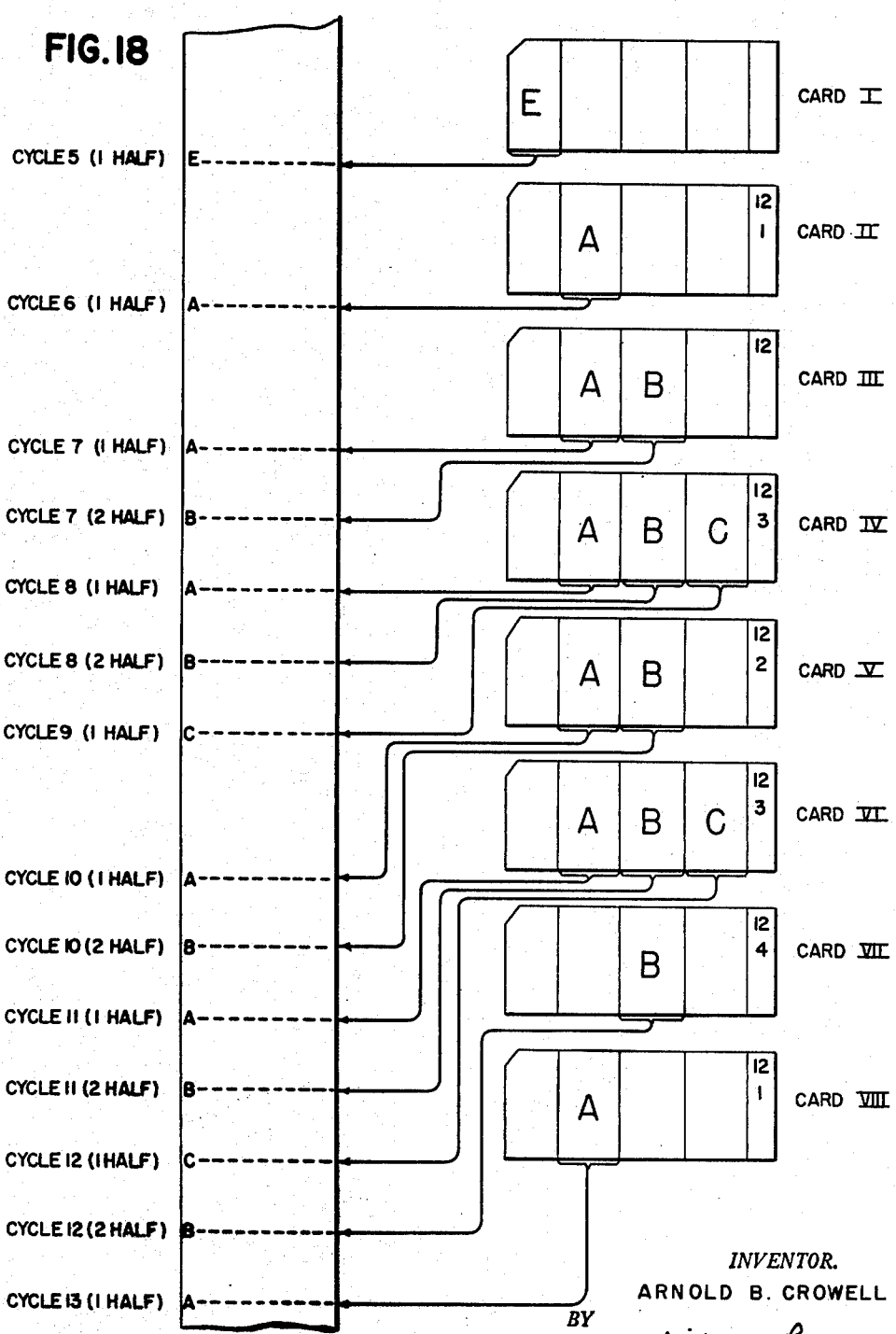

Fig. 18 represents in a diagrammatic manner a representative problem calling for single or multiple line printing from each of a group of record cards.

Figs. 19a and 19b taken together constitute a wiring diagram of the electrical circuits of the apparatus.

Figs. 20a to 20c taken together in the order named constitute a sequence diagram showing the sequence in which various electrical devices are operated in the operation of the machine under control of the group of cards of Fig. 18.

Figure 2:
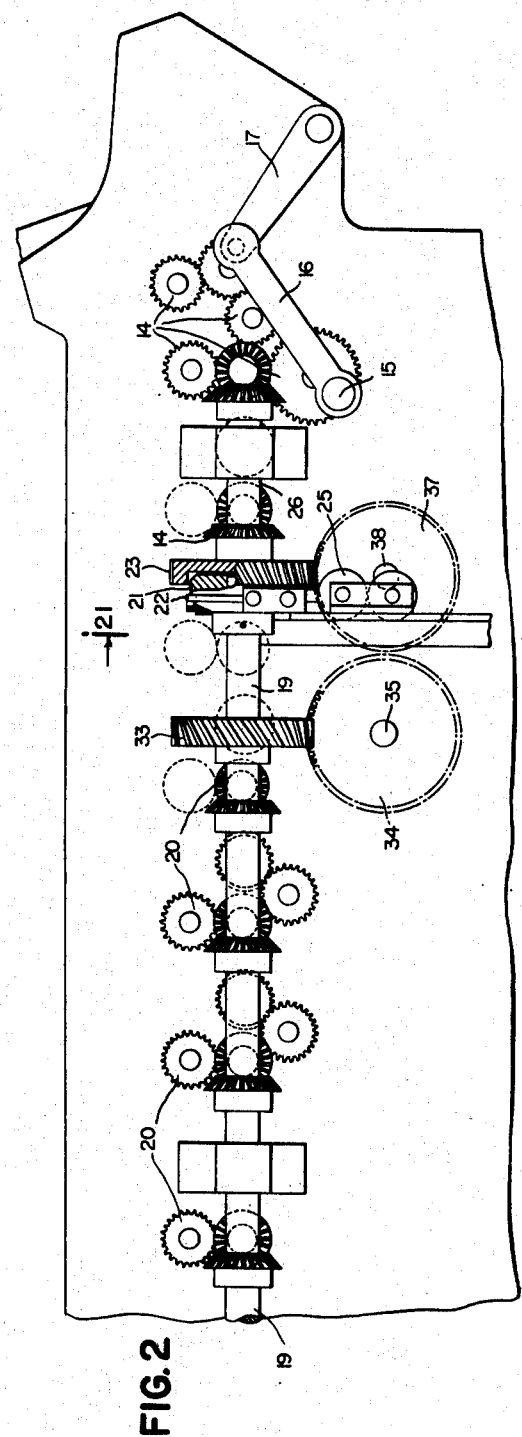
Fig. 2 is a schematic view showing the driving mechanism associated with the card feed rollers of Fig. 1.

Fig. 21 is a detail of the card feed clutch and is a section taken on lines 21—21 of Fig. 2.

Figure 22:
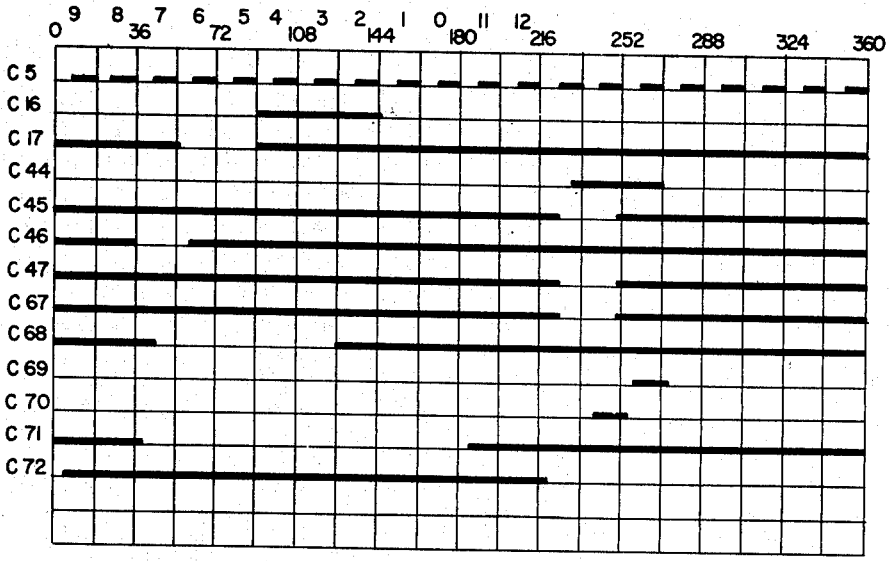

Fig. 22 is a time chart of the constantly running cam controlled contacts.

Figure 23:
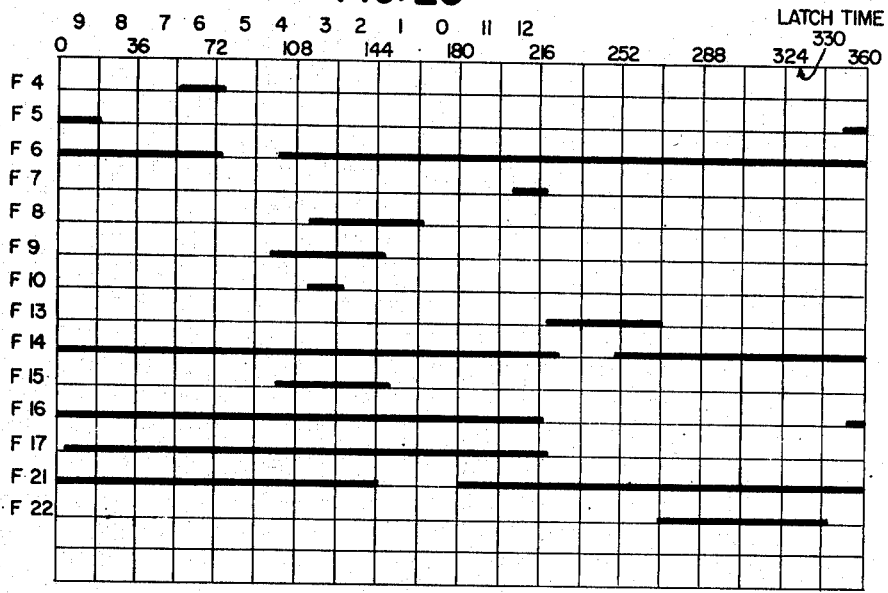

Fig. 23 is a time chart of contacts operated from the card feed mechanism.

The record card

The record card 10 for controlling the operation of the printing mechanism of the present invention is the well known IBM card provided with 80 columns of 12 index point positions as shown in Fig. 3. The coding of the various characters that may be represented on the card is shown in this figure, where it is noted that the digits are represented by single perforations in related index point positions, the alphabetic characters are represented by two perforations, one made in the digit representing positions 1 to 9 and the other in one of the so-called zone representing positions 0, 11 or 12. Special characters as identified above the card are represented by various other combinations as indicated.

For the purposes of the present invention, a predetermined column of the card, for example, column 80, is utilized to receive special perforations to identify the card as a particular type of so-called Multiple Line Card and to control the machine operations in varying manners. Specifically, if this column is perforated in the 12 and 1 positions, it signifies that a single line is to be printed from a selected field of the card. If it is perforated in the 12 and 2 positions, it signifies that two lines are to be printed from this card, one from each of two fields, and again if it is perforated in the 12 and 3 positions, it signifies that three lines are to be printed, each from a different field of the card. If the column is left blank, it also signifies that one line is to be printed from such card. If the column is perforated in the 12 and 4 positions, it indicates that a single line is to be printed from the card, and that such a card is a companion to a card with the 12 and 3 designation and carries in one of its fields what might be called the fourth line of an address or other similar group of lines of data.

Card feeding mechanism

Figure 1:
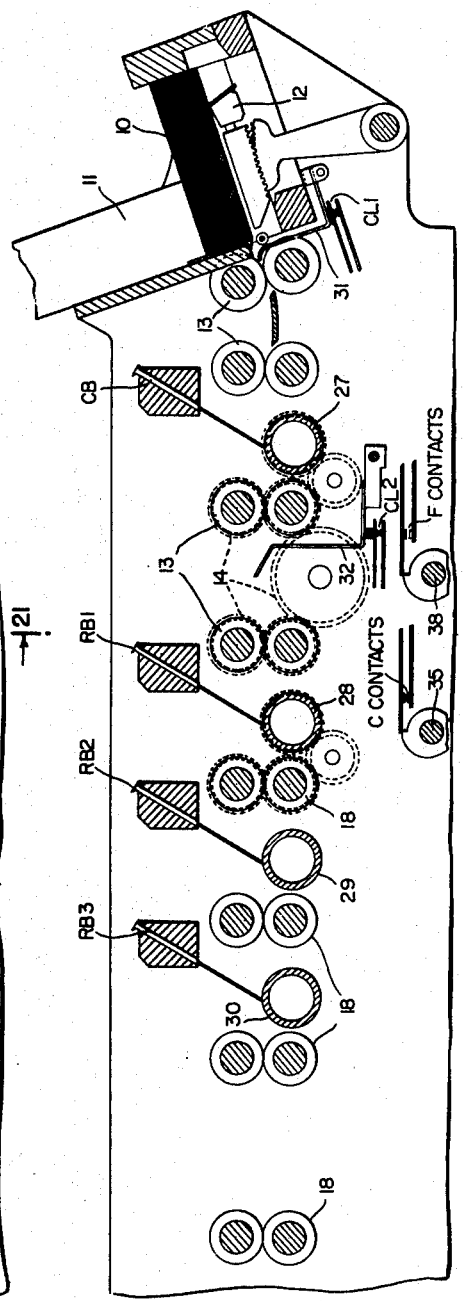
Fig. 1 is a schematic sectional view on a card feeding mechanism showing the path of movement of record cards.

The card feeding and sensing mechanism is of a well known type and is, therefore, illustrated in a diagrammatic manner in Figs. 1 and 2 to show the general relationship of the parts thereof and the special space relationship of the reading brushes for the purposes of the present invention.

Referring to Fig. 1, record cards 10 are placed in hopper 11 from which they are advanced singly by picker 12 to pairs of feed rollers 13 which are geared together for rotation through gearing generally designated 14 (Fig. 2). Through an eccentric pin 15 on one of the gears of the group 14 a link 16 controls arm 17 to reciprocate the picker 12 once for each revolution of the eccentric. After the card passes the last or fourth pair of rollers 13, it is received by the first of several pairs of rollers designated 18 which continues its movement toward the left, and from the last of these rollers it advances to the usual stacking mechanism (not shown).

The rollers 18 are driven from a common drive shaft 19 (Fig. 2) through gearing generally designated 20. This shaft may be geared to or driven by a suitable source of power so as to make one revolution per so-called cycle of the machine, and with the machine in operation this shaft rotates continuously. At its right hand end, as viewed in Fig. 2, there is provided a magnetically operated clutch comprising a clutch driving element 21 (see also Fig. 2) secured to the end of the shaft 19, and lying in the plane of this element is a spring urged clutch dog 22 pivoted to a gear 23. The armature 24 of a magnet 25 normally holds the dog out of engagement with the driving element 21, and upon energization of magnet 25 the dog is released for clutching engagement with the driving element 21, so that thereafter shaft 26, Fig. 2, to which gear 23 is secured, will rotate in unison with shaft 19 and the rollers 13, and picker 12 will be operated. When magnet 25 is deenergized, uncoupling will be effected and the picker 12 and rollers 13 will come to rest while the rollers 18 continue to rotate.

Located intermediate the two central pairs of rollers 13 (Fig. 1) is a reading station comprising a line of record sensing control brushes designated CB and cooperating common contact rollers 27. Spaced a distance beyond brushes CB is a second row of brushes designated RB1 identified as the first set of reading brushes. The distance between brushes CB and RB1 is defined as one card cycle, which is the distance from a given point on one card to the corresponding point on the adjacent card as they pass through the feed rollers. Two additional reading stations designated RB2 and RB3 are provided which are spaced a half cycle apart, and these three sets of reading brushes cooperate with conducting rollers 28, 29 and 30 respectively.

Referring to Fig. 15 which represents two card cycles or revolutions of the drive shaft 19 of Fig. 2, the points in the first or left hand cycle during which the index point positions 9, 8, 7, 6, etc. pass the reading brushes RB1, RB3 and CB are indicated as starting at the beginning of the cycle, while the passage of the index point positions 9, 8, 7, 6, etc. past the brushes RB2 occurs 180° or a half cycle later, or more specifically, while brush RB2 is reading the 9 position of a card, brush RB1 is reading the 11 position of the same card.

Referring to Figs. 1 and 2, when magnet 25 is deenergized, the rollers 13 and the picker 12 come to rest with one card held by the left hand pair of rollers 13 and the following card held by the right hand pair of rollers 13, while the pairs of rollers 18 continue to rotate to continue the movement of any preceding record cards. The timing is such and as will be explained in connection with the description of operation, this interruption of feed may occur for a period of one cycle of the machine, so that upon resumption the preceding card will have passed the brushes RB3 before the following card passes brushes RB1 and the next card concurrently passes brushes CB.

*Card lever contacts.*—Between the hopper 11 and the first pair of rollers 13 is located the usual card lever 31 which is rocked about its pivot by a passing card to close the usual card lever contacts CL1. Located between the left hand pair of rollers 13 is a second card lever 32 which may also be rocked about its pivot to close the usual card lever contacts CL2.

*Drive for the contact operating cams.*—Secured to the constantly running shaft 19 is a gear 33 (Fig. 2) meshing with a gear 34 on a cross shaft 35, upon which there is mounted a number of contact operating cams for operating a group of contacts prefixed C, whose timing is shown in Fig. 22, and constituting a group of so-called constantly operating cams which rotate continuously. The driven gear 23 has driving connection with the gear 37 secured to a shaft 38 upon which are mounted cams for operating a group of contacts prefixed F, whose timing is shown in Fig. 23, and which are known as card feed cams. These rotate only during the operation of mechanism connected to gear 23.

Printing mechanism

*Selector mechanism.*—Referring to Fig. 6c, there is provided for each type bar a print selector magnet designated 40U in Fig. 6c and 40L in Fig. 6d. Through circuit connections to be described, the magnet 40U will be energized in response to the sensing of perforations by the reading brushes RB1 and RB3, while the magnet 40L may be energized as a result of the sensing of perforations by the erading brushes RB2.

Considering the mechanism in Fig. 6c, the armature of magnet 40U engages a link 41 which is suitably mounted for vertical reciprocation and held in the position shown, wherein it is biased downwardly by a spring 42 acting on a lever 43 articulated with the upper end of link 41. A second spring 42a applies additional bias through a lever 43a. The lower end of the link rides on the periphery of a fluted shaft 44, which is timed as indicated in Fig. 15 to present the high point of a flute to the link 41 for each index point position or more specifically for each 18°. This shaft as seen in Fig. 8 has a beveled gear 45 connected at one end meshing with a companion bevel 46 secured to a shaft 47 with a 2:1 ratio. The shaft 47 has a gear 48 secured thereto which is driven through an idler 49 (see also Fig. 7c) by a gear 50 on the shaft 51. This latter shaft may be coupled to or driven from the constantly running shaft 19 of the card feed mechanism and makes one revolution per card cycle, so that through the gearing traced the fluted shaft 44 will make two revolutions per card cycle. Since the shaft 44 has ten flutes, they will pass a given point at the rate of 20 for each cycle.

During the rotation of the shaft, the high points of the flutes repeatedly contact the lower end of slide 41, lifting it slightly away from the latching armature of the magnet 40U. If at such time the magnet is energized, the link will be released to follow the contour of the fluted shaft and then be returned upwardly by the next rise. Since, as explained, a column may contain more than one perforation, this reciprocation of the link throughout its full stroke may occur one or more times during the reading of a card.

Extending transversely across the machine is a set of six shafts designated 52–3, 52–4, 52–1, 52–2, 52–6 and 52–5, arranged vertically in Fig. 6c in the order named. Pivoted on each of these shafts is a bail which is generally designated 53 (see also Fig. 8), each of which is connected by a link 54 to a spring operated lever 55 pivoted on a shaft 56, and having a cam follower roller cooperating with a cam on a shaft 57. This shaft (Fig. 7c) is driven through gearing generally designated 58 from the vertical shaft 47, so as to make one revolution per machine cycle. As the shaft rotates, depressions in each cam will enable the related lever 55 to rock slightly counterclockwise under the action of its spring to draw down its link 54 and rock the related bail 53 slightly clockwise. The cams on shaft 57 are generally designated 60 and are known as code cams whose contours are indicated in Fig. 15. In this figure, the sloped lines moving upwardly toward the right indicate the period for each cam when its related bail 53 is rocked clockwise, and from the outline it will be noted that the combinational arrangement is as follows:

At the 9 time bails 53 in the 4 and 6 positions are rocked;
At the 8 time bail 53 in the 6 position is rocked;
At the 7 time bails 53 in the 3 and 6 positions are rocked;
At the 6 time bails 53 in the 3, 4, 5, 6 positions are rocked;
At the 5 time bails 53 in the 3, 4, 5 positions are rocked;
At the 4 time bail 53 in the 5 position is rocked;
At the 3 time bails 53 in the 3 and 4 positions are rocked;
At the 2 time bail 53 in the 4 position is rocked;
At the 1 time bail 53 in the 3 position is rocked;
At the 0 time bail 53 in the 1 position is rocked;
At the 11 time bail 53 in the 2 position is rocked; and
At the 12 time bails 53 in the 1 and 2 positions are rocked.

Thus, in response to the sensing of each perforated position in the card column, the different bails 53 or combinations of bails will be rocked. Each of these bails has pivoted thereto at 61 (see also Fig. 11) a finger 62 extending into a suitable opening in the link 41, so that as the link reciprocates vertically it will rock the finger 62 about its pivot 61. For each link 41 there is provided a finger 62 associated with each of the six bails 53, and the operation of the six fingers 62 is the same, so that a detailed description of one will suffice for all.

Figure 11:
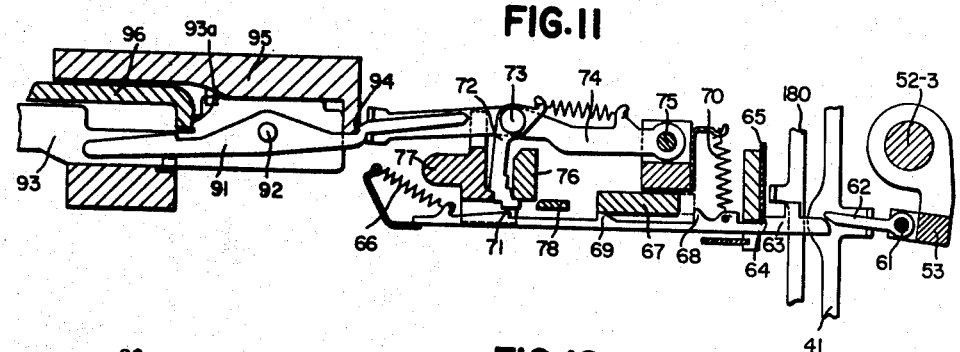
Figure 14:
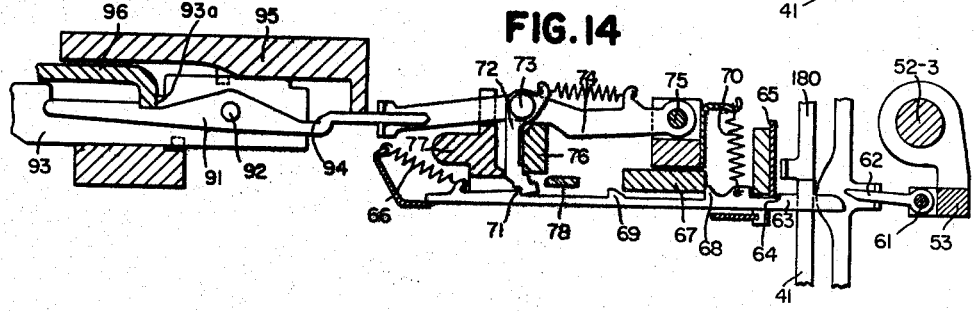

Taking, for example, the bail 53 associated with the shaft 52–3 in Fig. 11, the timing is such that bail 53 is rocked to the position shown in Fig. 11 from its position of Fig. 14, just before the link 41 descends in response to the sensing of a perforation and the consequent energization of magnet 40U. The rocking of the bail 53 has brought the free end of finger 62 over the right hand end of a slide 63, so that the downward movement of link 41 will cause the finger 62 to strike the right end of slide 63 and rock it downwardly to disengage a shoulder 64 thereon from latching engagement with the lower end of stationary plate 65. At the same time, a spring 66 connected to the left hand end of slide 63 will draw the slide toward the left to the position shown in Fig. 12. As explained, this action of tripping the slide 63 may occur throughout the reading or sensing period of the cycle, whenever the link 41 moves down its full stroke, and immediately after the tripping action the link is restored by the fluted shaft 44 in preparation for a possible further descent to trip the slide in another of the six positions.

Figure 12:
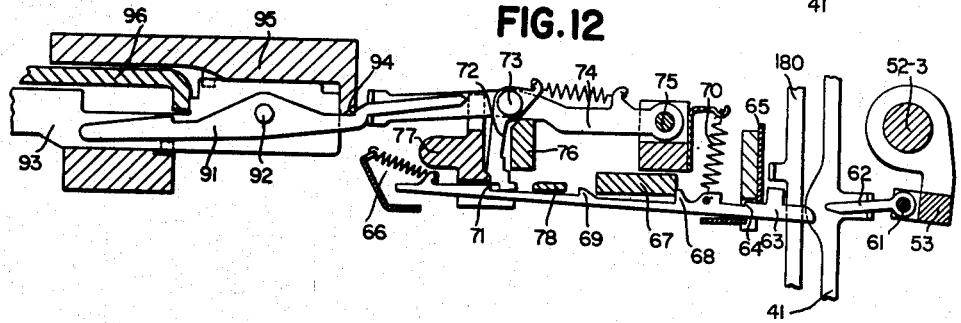

Later in the cycle, the bail designated 67 moves toward the right, as viewed in Fig. 12, to engage an extension 68 of slide 63 to return it to its right hand position. It will be noted by comparison of Figs. 11 and 12 that there is an extension 69 on slide 63 which normally lies beneath the lower surface of bail 67, and that there is a spring 70 connected to the slide so that it is urged upwardly with extension 69 bearing against the bail 67, and the surface adjacent to shoulder 64 bears against plate 65. Now, when the slide 63 is shifted toward the left, extension 69 slips out from under the bail enabling spring 66 to tilt the left end of the slide into the position shown in Fig. 12. In such position, a shoulder 71 forming a hook at the left end of the slide extends up into engagement with a spring pressed bell crank 72 which is pivoted at 73 to a lever 74, which in turn is pivoted to a stationary rod 75.

Figure 13:
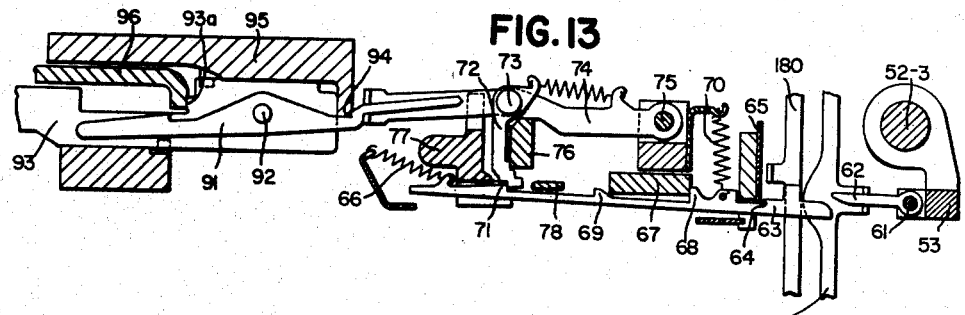

When the slide 63 is shifted back toward the right by bail 67, the hook 71 will engage bell crank 72 and rock it to the position of Fig. 13, where a stepped shoulder on the bell crank is rocked beneath the lower surface of a bail 76. This bail then descends and carries with it the bell crank 72 causing the lever 74 to be rocked counterclockwise from the position of Fig. 13 to that of Fig. 14. As bail 76 descends, the vertical arm of the bell crank is locked between the bail and a stationary cross bar 77, so that lever 74 will remain locked in this clockwise position until the bail ascends. There is provided a third bail 78 which may be reciprocated horizontally and at the timing indicated in Fig. 15, so that it moves toward the left before bail 67 moves to engage the bell crank 72 and insure that it is free of the bail 76 before a new setting is made.

It will be noted in Fig. 11 that bail 76 has a normal lowered position wherein it locks bell crank 72 against movement, and the timing is such that bail 76 rises as bail 67 moves to the right, so that the slide 63 may rock the released bell crank 72 and thereafter bail 76 descends to again lock the bell crank 72 in its shifted position.

*Operating mechanism for bails 67, 76 and 78.—* Referring to Fig. 7c, the bails 67 in all 6 positions are tied together with a common member or plate 79 which at its upper and lower ends is connected to a link 80 (see also Fig. 9), which is integral with a yoke having a pair of follower rollers 81 cooperating with a pair of complementary cams 82 secured to shaft 83 driven from the main drive shaft 51 by a gear 84, which meshes with gear 50. The bails 76 are supported on a common vertical bar 85 (Fig. 7c) which through pivoted triangular plate 86 and connecting rod 87 are operated by cams 88 (see Fig. 6c) secured to shaft 83. Finally, the bails 78 are secured to a common framework designated 79a in Fig. 7c, which through links 89 (Fig. 6c) is operated by cams 90 on shaft 83.

*Differential mechanism.—*The left end of lever 74 (Fig. 11) is bifurcated to receive the right hand extension of an interposer 91 which is pivoted at 92 on a bar 93. In the normal position of Fig. 11 a shoulder 94 of the interposer 91 engages lower right hand corner of a fixed stationary cross frame 95, and with the parts in position as shown in Fig. 11 bar 93 is effectively locked against horizontal movement. When, through the tripping of a slide 63 as explained, the lever 74 is rocked counterclockwise, it will rock interposer 91 in a clockwise direction as shown in Fig. 14. This will disengage shoulder 94 from the cross frame 95 and will cause the left end of the interposer to hook on to a cross plate generally designated 96.

Referring to Fig. 6c, there are six cross plates provided, one for each of the rods 52, and they are designated similarly as 96–3, 96–4, 96–1, 96–2, 96–6, 96–5, reading from top to bottom. It will thus be noted that tripping of any of the slides 63 will result in the related interposer 91 being rocked for engagement with the related cross plate 96. After this action has been effected, the plates 96 are moved toward the left, drawing with them those bars 93 whose interposers 91 have been rocked clockwise. The two uppermost cross plates 96–3, 96–4 are moved toward the left a distance that may be termed one unit. The slides 96–1 and 96–2 are moved a distance equal to 6½ units and the two lowermost slides 96–6 and 96–5 are moved a distance equal to 1½ units. Their operated mechanism is shown in Fig. 7c where, for example, the two uppermost plates 96–3 and 96–4 are connected together and fastened to a bar 97, which is mounted for reciprocation upon rollers 98, and extending rod 99 at its right hand end has connected thereto rollers 100 (see Fig. 6c) which cooperate with the cam 101 on the shaft 83. The central pair of cross plates is similarly reciprocated through similar linkage by a cam 102 and the lower pair by the cam 103 on the shaft 83.

Referring to Fig. 15, the movement of the cross plates 96 is designated by the uppermost line of the diagram, where the dotted line indicates the shorter movement of the upper and lower pairs of plates, while the full line designates the movement of the central pair.

Referring to Figs. 6b and 6c, the bars 93 selectively moved toward the left by the plates 96 are separately designated as 93–3, 93–4, etc., with these bars moving different extents as explained. In Fig. 6b, bars 93–3 and 93–4 are connected to a vertical lever 105 which at its lower end is pivotally connected to a rack 106. The bars 93–1 and 93–2 are connected to a vertical lever 107 whose lower end is link-connected to a sliding plate 108. The third pair of bars 93–6 and 93–5 are connected to a lever 109 whose upper end is link-connected to a sliding rack 110. The rack 106 engages a gear 111 pivoted on slide 110, which gear meshes with a double rack 112 whose lower edge meshes with a gear 113 carried by the slide 108. This gear 113 also meshes with a double rack 114 whose lower edge meshes with a gear 115 pivoted on a rack 116. The teeth in the lower edge of this rack (see Fig. 6a) mesh with teeth 117 of a sector 118 pivoted at 119. A second set of teeth 120 on the segment 118 meshes with rack portion 121 of the type bar 122.

The arrangement of slides, racks and gears extending between the bars 93 and the type bar 122 are proportioned to raise or lower the type bar 122 in multiples of the unit distance referred to hereinabove.

Referring to Fig. 16, this view represents diagrammatically the linkage extending between the bars 93 and the type bar 122, and with the aid of this diagram it will be noted that, if the bar 93–3 is moved one step or unit toward the left, lever 105 will be rocked counterclockwise about its midpoint to draw slide 106 one unit toward the right and through gear 111 move slide 112 one unit toward the left, which in turn through gear 113 will move slide 114 one unit toward the right, and this in turn will cause gear 115 to roll on a rack 114L to move slide 116 one-half unit toward the right, rocking sector 118 clockwise. The ratio of the diameters of teeth 117 and 120 is 1:2, so that the half step movement of rack 116 will result in a full unit or step of upward movement of rack 121, positioning the type bar 122 one unit up from the position indicated as the home position. This upward movement is termed "movement in a minus direction." For the purposes of the foregoing explanation, it is assumed that the slide 114L is at rest.

Movement of the bar 93-4 toward the left for its one unit of extent of movement will rock the lever 105 about its upper end in a clockwise direction, shifting the slide 106 two units toward the left, and this through the gear and rack connection will result in moving the type bar 122 two steps downwardly or in a plus direction, as indicated on the scale at the left of the figure.

Movement of the bar 93-5 will rock lever 109 clockwise to draw rod 110 one and a half units toward the right, carrying the center of gear 111 therewith. This will cause slide 112 to move three steps toward the right and will in turn through gear 113 result in downward movement of the type bar 122 three units.

Movement of the bar 93-6 one and a half units toward the left will rock lever 109 counterclockwise about its lower end to displace slide 110 three units toward the left with consequent shifting of the slide 112 six units in the same direction, to ultimately elevate the type bar 122 six steps from the home position.

Movement of bar 93-1 six and a half steps toward the left will rock lever 107 to draw slide 108 six and a half steps toward the right, and with rack 112 stationary rack 114 will be shifted thirteen steps toward the right to position the type bar upwardly thirteen units.

Finally, movement of bar 93-2 six and a half units toward the left will rock lever 107 clockwise about its upper end to shift slide 108 thirteen units toward the left and through gear 113 shift the slide 114 twenty-six units toward the left to lower the type bar 122 twenty-six units or steps.

Having traced the type bar movement for the six bars 93 individually, it will be apparent that any combination of movements will result in movement of the type bar in accordance with the algebraic sum of the plus and minus movements.

Fig. 17 is a chart representing for each card code combination a particular interposer bar 93 that will be coupled for movement for each character combination on the record card. For example, at the top of the chart the character N is represented on the card as a 5 and an 11 perforation. This, through the selector mechanism and the code cams 60, will select the 2, 3, 4 and 5 interposer bars for movement which individually will move the bars units of +26, −1, +2 and +3 steps. The algebraic sum of these movements is +30, so that the type bar 122 will be moved thirty units downwardly.

The type bar carries type printing elements designated 123 which are spaced along the bar distances equal to the unit movement referred to, so that the elements are spaced accordingly with the character N thirty units or steps from the home position. When the hole combination for this character is sensed in the record card, the corresponding type element 123 will be brought to the printing line. Following the chart of Fig. 17, any other character may be traced and its position determined.

Referring to Fig. 6d, the magnet 40L in each order controls a duplicate set of selector mechanisms operated from cams generally designated 60L mounted on a shaft 57L and operating bails 53 from shafts designated L52-5, L52-6, L52-2, L52-1, L54-4, L52-3 which in turn trips slides 63 of this lower set to rock interposer hooks 91 for engagement with a set of lower slide plates identified as L96-5, L96-6, L96-2, L96-1, L96-4 and L96-3, which in turn operate the lower set of bars 93 which are designated with the same reference character as the corresponding bars in the upper set with the prefix L. These bars and the racks and slides connected thereto are diagrammatically shown in Fig. 16, where it will be noted that the arrangement is reversed and the movement of the bars is transmitted to the central slide 116 through engagement of rack 114L with the lower teeth of gear 115. In the same manner, movement of any bar 93 or combination thereof in the lower set will position the type bar in accordance with the chart of Fig. 17. The time of movement of the cross plates 96 in the upper set and the plates of the lower set is indicated in Fig. 15, where it will be noted that the movement of the two sets of bars occurs at the same time but in opposite directions.

It will also be noted particularly with reference to Fig. 14 that, when a bar 93 has its hook 91 engaged with the plate 96, the bar is securely engaged with the plate for positive movement therewith in both directions, the leftward movement being through engagement with the hook end of the interposer 91, and movement toward the right will be brought about by engagement of the plate 96 with shoulder 93a of the bar.

Referring also to Fig. 15, the time in which the reading brushes RB2 transmits impulses to the magnets 40L is indicated as occurring for each of the index point positions of the card at just 180° or a half cycle later than the sensing of the corresponding index point position by brushes RB1 and RB3. It will be noted also that there is a period of overlapping of the reading operations between 180° and 198°. The sensing of the 11 index point position by brush RB1, for example, is concurrent with the sensing of the 9 index point position of another card column by the brushes RB2, and also the sensing of the 12 will be concurrent with the sensing of the 8 position in another column. For the lower set of mechanism, the setting devices are controlled by the parts 76, 78 and 67 and designated on the lines marked "lower," and these, too, it will be noted, are spaced 180° from the operation indicated for the upper set.

Referring to Fig. 16, since the bars 93 are moved in opposite directions at the same time, if a setting of the type bar is made through the upper differential mechanism and the next setting is for the same character and made through the lower differential mechanism, there will be no movement of the type bar since for the first setting the bar 114 will move a selected distance in one direction, and its return movement will occur at the same time and for the same extent as the movement of the bar 114L in the opposite direction, resulting in the mere rotation of the connecting gear 115 without any horizontal translation thereof. This will be true in the case of any character or symbol. Where successive character positions on the type bar are different, the type bar will move directly from its initial setting to the next setting.

*Differential bar aligners.*—In Fig. 6b, the slides 106, 112 and 114 of the upper set and the corresponding slides of the lower set are provided with aligning notches generally designated 125, into which vertically reciprocating aligning plates generally designated 126 are adapted to be lowered or elevated, as the case may be, at times in the cycle indicated in Fig. 15, where the aligners are identified by the reference character of the related slide. The several plates 126 are shown in Figs. 7b, 7c, and 7d, where through linkage generally designated 130 the several plates may be operated by three horizontal pull rods 131 that extend to cam follower levers 132 for engagement by cams 133 on the shaft 51. Cams 133 are double lobed (see Fig. 15) so as to operate the aligning plates twice in each cycle.

In Fig. 15 the rises or high portions of the line representing the aligners indicate the period in the cycle when the aligners are in engagement with the aligning notches in their related slides. Normally, and at other times in the cycle, the aligners are out of engagement with the aligning teeth. The type bar 122 is also provided with aligning teeth designated 135 (Fig. 6a) and an aligning plate 136 which in Fig. 7a is pivoted at 137, and through link connection 138 is operated by pull rod 137T from a cam 133T on shaft 51 (Fig. 7c).

*Print hammer mechanism.*—The print hammer 140 is shown in Fig. 6a where it is shown as spring biased toward the left through lever 141 and spring 142. A trigger bail 143 engages under a shoulder on the hammer normally holding it toward the right against the action of its spring. This bail is held in its upper position by spring 144 (Fig. 7b) and through linkage designated 145 is rocked counterclockwise through a pull rod 146 (Fig. 7c) operated by a cam 147 on shaft 51 (see Fig. 10). As shown in Fig. 15, the bail 143 is rocked twice in each cycle at the points indicated. Extending across in a notch in the right end of the print hammers 140 is a restoring bar 148 which in Fig. 7b is operated through linkage 149 and pull rod 150 by a cam 151 on shaft 51.

Referring to Fig. 15, it will be noted along the line designated CB, RB1, RB3 Card Impulses that the index point positions are sensed during the first half of each cycle. These impulses are transmitted through circuits yet to be explained to the upper print magnets 40U, where under control of the bails 76, 78 and 67 operating near the end of the cycle appropriate selectors or interposers 91 are set for movement with the upper set of cross plates 96. During the beginning of the next following cycle and near the midpoint of this cycle (162°), the print hammers are tripped to print in accordance with the data sensed in the first half of the preceding cycle. The data, read as indicated on the line designated RB2 Card Impulse during the latter part of the first cycle, controls the print magnets 40L and through the bails 76, 78 and 67 identified as "lower" operating bails in the following cycle selects the interposers for movement by the lower set of cross plates 96 in the second half of the second cycle, after which at the end of the cycle (around 342°) the print hammers are tripped to print the data read in the latter part of the cycle.

*Paper spacing mechanism.*—Referring to Fig. 7d, the shaft 51 through bevel gears 152 drives a shaft 153 (Figs. 7b and 7a) whose opposite end through bevel gears 154 drives a vertical shaft 155 which in turn through gearing generally designated 166 drives a pair of gears 167 on shafts 168. Shafts 168 in Fig. 6a drive rollers 169 between which record material 170 is driven continuously through the gear connections traced.

The record material passes over a U-shaped frame 171 whose ends are anchored to blocks 172 and whose right hand end passes over printing platen 173 with a suitable opening therein, through which the type elements 123 may press the record 170 against the platen. A suitable ink ribbon 174 is also provided which may have operating mechanism (not shown).

In Fig. 7a the gearing 166 drives a shaft 175 upon which in Fig. 6a is mounted an eccentric cam 176, the gearing being such that the cam rotates twice each machine cycle, and in rotating will engage a contact block 177 integral with the U-shaped frame 171 to cause oscillation of its right hand end with the frame flexing at points designated 178. The effect of this is that, while the record is drawn with a continuous movement upwardly and around the frame, the momentary downward movement of the right end of the frame will in effect bring that part of the record to rest, and the timing is such that this area or line in the record comes to rest at the time the printing hammers are fired, so that a clear impression can be taken at such time.

*Zero elimination device.*—Referring to Fig. 6c, there is provided in each order a vertical link 180 which has extensions 181 thereof adjacent each of the slides 63, except the one operated by shaft 52-1. When the slides have been selectively unlatched and moved toward the left, as in Fig. 12, slide 180 is released for downward movement under the influence of a spring 182. If any of the interposers 63 in the 3, 4, 2, 6, or 5 positions have been moved toward the left, the extensions 183 at the right end thereof will block the slide 180 against full downward movement. If none of these five interposers 63 have been shifted, the slide 180 will move sufficiently to enable rocking of lever 184 to close a pair of contacts 185. The reason that no projection 181 is provided in the 52-1 position is that, when a zero is sensed in the record and magnet 40U energized in response thereto, only the interposer controlled from the shaft 52-1 is operated (see Fig. 17), and this through the mechanism traced will position the type bar in its zero printing position. Whether or not this printing will take place will be determined through circuit connections controlled by contacts 185 in adjacent orders of the mechanism.

Briefly stated, closure of contacts 185 in any order will be prevented if a significant character or any setting other than zero is made in that column or if no setting is made in such column. In the drawings, slides 180 are shown associated only with the upper set of selecting mechanism. A similar slide may be provided, if desired, in the lower mechansm. For restoring and lowering the slides 180 there is provided a bail 186 pivoted at 187 which has link connection 188 to a follower mounted on the shaft 56, with a suitable roller cooperating with a cam (not shown) on the shaft 57 whose timing is indicated in Fig. 15.

Illustrative problem

The foregoing has described the several mechanical components of the machine and the manner of their individual operation. A representative problem will now be described and thereafter the complete operation of the machine, cycle by cycle, will be set forth to explain the manner in which the machine functions in carrying out the problem presented.

Referring to Fig. 18, a group of seven cards 10 designated as Card I, Card II, etc. are fed through the machine in the order named, and each will selectively control the printing of one, two or three lines of data on the record sheet or strip 170. Each card 10 is indicated as having four data fields in which items generally designated as A, B, C or E are represented. These are denoted by letters for simplicity of explanation, but in reality constitute perforations in columns according to the coding arrangement of Fig. 3. The right hand columns are variously coded as indicated by perforations 12, 1; 12, 2; 12, 3; etc. or left blank, and the machine will be controlled thereby as will be explained. The record sheet 170 is automatically spaced two separate steps or lines for each cycle with the item E printed on the first line during the first half of Cycle 5, as noted, and the items on the other cards printed subsequently, and the positions indicated and in the order outlined.

Preliminary plug connections

Referring to the circuit diagram (Fig. 19b), for the problem presented plug sockets of the first set of reading brushes RB1, which traverse the A field of the cards, are connected to plug sockets designated Line 1 Entry through plug connections 200. Those brushes in the first set of reading brushes RB1 that traverse the E field of the cards are connected through plug connections 201 to plug sockets designated Normal Entry. The plug sockets of the second or intermediate reading brushes RB2 that traverse the B field of the cards are connected through plug connections 202 to plug sockets designated Line 2 Entry. The third or last set of reading brushes RB3 that traverse field C of the cards are connected through plug connections 203 to plug sockets designated Line 3 Entry. For each card field only a single column is shown plug connected as representative.

Further connections are made designated 204 between plug sockets designated Lines 1-3 Exit and sockets designated MLP Entry (multiple line print). A further plug connection 205 is made from the socket related to the brush CB of the control set that traverses the column of the card in which the code designations occur to a plug socket (Fig. 19a) designated MLP Control.

First machine cycle

The term "machine cycle" as herein employed represents one revolution of the main drive shaft 19 and also one revolution of each of the contact controlling cams prefixed with a C. With the cards placed in the feed hopper, the operator will close start key contacts designated ST (Fig. 19a) which are to be held closed for three cycles to insure that the first card is advanced sufficiently to pick up the usual card levers which will maintain the machine in operation as long as cards continue to advance from the hopper.

With the main shaft 19 in operation through any suitable source of power, a circuit will be completed from line 206 (Fig. 19a), start key contacts ST, pick-up winding P of relay R546 to ground. This relay will close its *a* contacts to provide a holding circuit through its second winding H which extends through contacts F21 which are normally closed. The timing of the contact operating cams prefixed F is shown in Fig. 23. When the card feed mechanism controlled through the related clutch is at rest, the F contacts are in open or closed condition as indicated along line designated "latch time" at the 330° coordinate. During each cycle of operation of the card feed, these contacts operate through a complete revolution starting at 330° and back again.

In Fig. 22 is shown the timing for the constantly running contact controlling cams prefixed C. The relationship between these contacts and those prefixed F is such that, when both are in operation, they are in synchronism with respect to the cycle point or degree markings on the two charts, that is, zero time for the C cams coincides with the zero time for the F cams.

In the following and to simplify the description, the relay magnets will be designated with the prefix R and the various relays will be referred to as R1, R2, etc., without expressly designating them as relays. Also as is customary in circuits of the present type where, for simplicity of circuit arrangement, contacts are located at points removed from their controlling relays, the relays will be shown in dotted outline adjacent to the contacts and designated with the proper reference numerals.

Relay R546 also closes a pair of contacts designated *b* (Fig. 19a) which complete circuits through the pick-up winding P of relays designated R545 and R543 under control of constantly running cam controlled contacts C16, which energize these relays at the time indicated in the sequence diagram (Fig. 20a). Relay R543 closes its *a* contacts to provide a holding circuit traceable from line 206, contacts C17, *a* contacts of R543 to ground. A circuit is now completed to energize the card feed clutch magnet 25 which is traceable from line 206, through contacts F22 (now closed), *b* contacts of R543, *b* contacts of R142, to the card feed clutch magnet and to ground.

The energization of the card feed clutch magnet occurs upon energization of R543 as indicated on the sequence chart (Fig. 20a), and picker 12 starts to move near the end (330°) of this cycle so that at the beginning of the next machine cycle the first card will be advanced from the hopper and moved up to the control brushes CB to a position where the first or "9" row of index point positions is about to pass the brushes.

Second machine cycle

As the card moves from the hopper up to the control brushes CB, it will engage and close the first card lever 31 to close card lever contacts CL1, so that a circuit will be completed therethrough by contacts F13 to energize R561 at the time indicated in the sequence diagram. R561 closes its *a* contacts to provide a holding circuit through contacts F14 and though the overlap in the operation of these two cam contacts R561 will remain continuously energized as long as cards are fed from the hopper.

Near the end of the second machine cycle when contacts F22 again close (see Fig. 19a), a circuit to the card feed clutch magnet 25 is reestablished to initiate a second card feed cycle, during which the first card is advanced past the control brushes CB, and the next following card is advanced from the hopper up to the control brushes.

Third machine cycle

Since, for the example chosen, it is assumed that this first card (Card I) does not contain perforations in its last card column, no circuits will be completed through the control brushes CB for this first card. During this cycle, the first card will engage the second card lever 32 to close the related card lever contacts CL2 which will energize R562 through contacts F13, and consequent closure of the *a* contacts of R562 will set up a holding circuit through contacts F14 in parallel with the holding circuit for R561. R562 closes b contacts in Fig. 19b to connect the common brush of the first reading station RB1 to line 206, through contacts F17 and circuit breaker contacts C5.

*Fourth machine cycle*

During this cycle, the first card (Card I) will pass the first set of reading brushes RB1 and data in the E field thereof will be sensed and circuits completed to condition the printing mechanism to print the data contained in this E field. At the same time the second card (Card II) will pass the control brushes CB where the code designation 12, 1 will be sensed and the third card (Card III) will be advanced from the hopper and fed up to the control brushes CB. As the E field of Card I traverses the first set of reading brushes RB1, circuits will be completed from line 206 (Fig. 19b), contacts C5, F17, b contacts of R562, the common contact roll 28 of these brushes, through the perforations, brushes RB1, a contacts of R301 (now closed as will be presently explained), plug connection 201, a contacts of R145 (normal), a contacts of R148 (normal), and upper print magnet 40U to ground.

In any column of the E field the related print magnet 40U will be energized for each perforation present in such column, and under control of the mechanism previously explained will set up on the upper set of control mechanism of Fig. 6c the appropriate number of slides or latches 63. The setting of this mechanism takes place in the first half of the fourth machine cycle, and the print hammers are tripped to print the resultant type bar setting in the following (fifth) cycle as indicated in Fig. 20a.

Referring to Fig. 20a, the designation Card I, Card II, Card III, etc. indicates the period in the cycle during which the card is read, and the oblique line designated 208 indicates that the tripping of the hammers to print the data set up at this time will occur near the middle of the next cycle of the machine, or in this case near the middle of the fifth machine cycle.

R301 (Fig. 19b) is energized through a circuit from line 206 through contacts F16 and for the period indicated in Fig. 20a. Referring now to Fig. 19b, the code designations of Card II, namely, the perforations in 1 and 12 positions of the right hand column, are sensed by the control brushes CB, which at the 1 time in this cycle will complete circuits from the common contact roller 27 and brush CB in the highest position, plug connection 205 (Fig. 19a), contacts F3 (closed at "1" time), to pick-up winding P of R122. Later, at the 12 time, a parallel circuit extends from the connection 205, through contacts F7 and R121 (see also Fig. 20a). These two relays close their respective a contacts to set up parallel holding circuits through F6. The energization of R121 and R122 closes their respective b contacts to complete a circuit through contacts F5 to energize R127 and R145. R127 closes its a contacts to provide a holding circuit through contacts C47. A parallel holding circuit extends from contacts C47, through the a contacts of R127 and a pair of c contacts of R142 (normal) to the holding winding of R145. These relays will accordingly be held for the period indicated on the sequence diagram, which shows they are picked up near the end of the fourth cycle and held through the greater part of the next following or fifth cycle, during which Card II passes the first set of reading brushes RB1 and the data in its field A will be read by these brushes.

Referring to Figs. 19a and 20c, closure of contacts F15 in the second machine cycle has energized R565 which closed its a contacts to provide a holding circuit through contacts C68. R565 closes its c contacts to complete a circuit from line 206, contacts F13, c contacts of R565 and pick-up winding of R566. R566 closes its a contacts to provide a holding circuit through contacts C67, and due to the overlap in timing of C67 and F13, R566 will remain energized as long as the card feed continues to operate.

During the second half of the fourth cycle, the first card passes the second or intermediate set of reading brushes RB2, but no circuits will be completed therethrough because the a contacts of R134 are open during this period.

*Fifth machine cycle*

In the first part of this cycle, the first card is passing the third or last reading brushes RB3 with no circuits being completed therethrough, because the relay R127 is energized during this period and its b contacts in Fig. 19b are shifted to discontinue any circuits to the plug connections 203 extending to this last set of reading brushes. Concurrently (see Fig. 20a), the second card (Card II) is passing the first set of reading brushes RB1, where the data in the A field thereof will be read and will control the printing selection circuits through the following representative circuit that extends from the common contact roller 28 (Fig. 19b), to the first set of reading brushes RB1, the a contacts of R301 (closed), plug connection 200, b contacts of R127 (now shifted), plug connection 204, a contacts of R145 (now shifted), a contacts of R148 (normal) to the upper print selecting magnet 40U and thence to ground.

As a result, the data in field A of the second card will be printed during the next following or sixth machine cycle, as indicated in the diagram by the oblique line 208. While this setting is taking place, Card III containing the multiple line code designation 12, 2 indicating that this card is to control the printing of two lines from its A and B fields in passing the control brushes CB, where the 12 and 2 perforations in the right hand column are sensed to complete circuits similar to those traced for the preceding card, which extend in Fig. 19a through the plug connection 205 and contacts F8 and F9 in parallel to energize R122 and R124 in response to sensing of the "2" perforation. In response to the sensing of the 12 hole, R121 will again be energized as before and the holding circuits will be established through contacts F6 for the period indicated on the sequence diagram (Figs. 20a and 20b). Since both R121 and R122 are energized, relays R127 and R145 will be energized and held as before. In addition thereto, and as a result of the energization of R124, relay R134 will be energized through the c contacts of R121 and R124 in circuit with contacts F4. R134 closes its a contacts to provide a holding circuit through contacts C46 which will maintain R134 energized for the period in cycle 6, as indicated on the sequence diagram.

*Sixth machine cycle*

As this Card III passes the first set of sensing brushes RB1, print circuits are completed in response to sensing of the data in the A field of the card from these reading brushes (Fig. 19b) through a contacts of R301, plug connection 200, b contacts of R127 (shifted), connection 204, a contacts of R145 (shifted), a contacts of R148 to the print selecting magnets 40U of the upper set. As a result, this data from field A will be printed under control of the first reading brushes RB1.

During the later half of the same machine cycle, the B field of Card III passes the intermediate set of reading brushes RB2 and circuits will be completed to energize the print selecting magnets 40L of the lower set through the following representative circuit extending from the intermediate brushes RB2 (Fig. 19b), plug connection 202, a contacts of R134 (now closed) and print select magnets 40L of the lower set. This reading of both the A and B fields of Card III is represented diagrammatically on the sequence diagram under cycle 6, and the oblique line connection indicates the points in the next following or seventh cycle in which the print hammers are fired to effect the actual printing.

*Seventh machine cycle*

In the preceding cycle (cycle 6), while the fourth card (Card IV) with the code 12, 3 is passing the control brushes CB, circuits are completed from the control brush CB reading the right hand column of the card and extending through plug connection 205, contacts F8, F9 and F10 (Fig. 19a) to energize R122, R124 and R125, all of which close their a contacts to provide holding circuits through F6. As before and at the 12 time in the cycle, R121 is again energized so that at the end of cycle 6 we now have the four relays R121, R122, R124 and R125 energized, and these will control the establishment of circuits, whereby the three lines A, B and C of this fourth card will be printed in succession. The closure of the b contacts of R121 and R122 will energize R127 as well as R145 as before, and R127 will close its a contacts to provide a holding circuit for these relays (see Fig. 20b). R125 closes its b contacts (Fig. 19a) so that now a relay R142 will become energized through a circuit from line 206, contacts F5, b contacts of R121, and b contacts of R125 to R142 and ground.

As indicated on the sequence chart, R142 is thus energized concurrently with R127 and R145. R142 closes its a contacts to provide a holding circuit through contacts C45. A parallel holding circuit extends from the a contacts of R142 through a pair of d contacts of R134 to line 206, so that this relay will remain energized until R134 has become deenergized and C45 has opened. As noted, R134 is energized throughout the second half of cycle 6, during which the contacts V45 open and reclose again so that R142 will remain energized for a period extending throughout cycle 7 and into the second half of cycle 8.

R142 shifts its c contacts so that R145 is held concurrently with R142 as is represented on the sequence chart. With these relays energized as explained, Card IV in passing the first set of reading brushes RB1 will have circuits completed through perforations in its A field traceable from the brushes RB1 through the a contacts of R301, plug connection 200, b contacts of R127 (shifted), plug connection 204, a contacts of R145 (shifted), a contacts of R148 to the print select magnets 40U of the upper section.

In the following half of cycle 7, the same Card IV is traversing the intermediate set of reading brushes RB2 and circuits are now traceable from those brushes RB2 which traverse the B field of this card, through plug connections 202, a contacts of R134 (now closed) to the print selecting magnets 40L of the lower section. Finally, as the Card IV traverses the third set of reading brushes RB3 in the first half of cycle 8, perforations in the C field will complete circuits from these brushes through connections 203, b contacts of R127 which are now back in normal position, plug connection 204, a contacts of R145 (shifted), a contacts of R148 (normal) to the print selecting magnets 40U of the upper section.

It is thus noted that for this three line card the first line (A) is set up on the upper print selecting mechanism, the second line (B) is set up on the lower section, and the third line (C) is set up on the upper section with the operations overlapping so that the printing of the first line occurs during the setting up of the data for printing the third line.

It is necessary to skip a card feed cycle following the sensing of a three line card, that is, the card feed is interrupted to prevent the next following card from passing brushes RB1, where such following card is of the type represented by the first, second, third or fourth cards, hereinbefore considered. The reason for this is that the C field of the three line card is passing the last reading brushes RB3 for control of the upper print selecting mechanism, which mechanism is also controlled by the first set of reading brushes RB1 past which this next card would pass if not interrupted, bringing about a conflict. The interruption of the card feed is effected by opening of b contacts of R142 (Fig. 19a), which interrupt the circuit to the card feed clutch magnet 25, which prevent resumption of the energization of the card feed clutch magnet, so that the picker mechanism and the feed up to the first set of reading brushes RB1 will be interrupted.

Referring to Fig. 20b, it will be noted that just at the end of cycle 6, R142 is energized, after R122 has been energized and held, and after magnet 25 has been energized to initiate feed cycle 7. During cycle 7, at the time magnet 25 would normally be energized to continue the card feed, R122 and R142 are now both energized, so that there is no circuit path in Fig. 19a to reenergize magnet 25 and the F cams come to rest.

*Eighth machine cycle*

During this cycle the Card IV advances past the third or last set of reading brushes RB3 as explained, while the next following card (Card V) remains at rest in a position about to pass the first set of reading brushes RB1. During the second half of the eighth cycle R142 is deenergized, so that the card feed clutch circuit may again be completed to energize the magnet 25 and cause the feeding of the next following card (Card VI) and the advance of the Card V past the first set of reading brushes RB1. This fifth card for purposes of illustration is another two line card with the code 12, 2 perforated in its right hand column. These code perforations were sensed while this card passed the control brushes CB during the first half of the seventh cycle, and in the manner already explained will have caused energization of R122, R124 and R121. These relays as also explained are held through contacts F6 which, when the feed is interrupted, will come to rest with the contacts closed, so that the relays R121, R122 and R124 will be held energized throughout cycle 8, as indicated in Fig. 20b.

It will be noted also in the sequence diagram that R127 is not held energized throughout cycle 7, because the F cams stopped before closure of F5 but, upon resumption of card feeding, their closure will cause energization of R127 near the end of cycle 8.

Ninth machine cycle

During this cycle the two line card, which is the fifth in Fig. 18 is advanced through the card feeding mechanism, wherein its A field will be read by the first reading brushes RB1 and the B field will be read by the intermediate or second set of reading brushes RB2 in substantially the same manner as was explained in connection with cycle 6 and as diagrammatically represented in the sequence chart. The next following card (Card VI) which is a three line card will have its code 12, 3 sensed by the control brushes CB as it moves past the same during this cycle to energize the relays R121, R122, R124 and R125 as indicated in the sequence chart. These will in turn energize R127 and set up circuits as explained in connection with cycles 7 and 8 for printing three lines from this card.

Tenth machine cycle

It was explained before, that the advent of a three line card would bring about interruption of the card picker mechanism for one cycle following such card. Where, however, the immediately following card is one having the code 12, 4, this interruption will be prevented. For the example chosen, the 12, 4 card, which is the seventh card in Fig. 18, has its code designations sensed by brushes CB during cycle 10, at which time circuits are completed from the control brushes through the plug connection 205 as before, thence through contacts F9 and F7 (at the 4 and 12 times respectively), to energize R124 and R121. At this time R127 is not energized (see sequence chart diagram) but R134 is again energized at the beginning of cycle 11 through the c points of R121 and R124.

The preceding three line card, as explained, has caused energization of R142 as indicated, and this opens its b contacts (Fig. 19a) to interrupt the circuit to the card feed clutch magnet 25. However, the now energized relay R124 has closed its b contacts, so there is now provided a shunt around the open b contacts of R142, so that the card feed clutch magnet is held energized and feeding is not interrupted.

It will be recalled from the preceding three line card that the first line thereof was read by the first set of reading brushes RB1, the second line by the intermediate reading brushes RB2, and the third line by the last or third set of reading brushes RB3. As the C field of the three line card passes the third set of reading brushes, the Card VII is passing the first set of reading brushes RB1, but no circuits are completed through the latter because these particular reading brushes are not connected.

Eleventh machine cycle

In the second half of cycle 11, the B field of the Card VII passes the intermediate reading brushes RB2, and circuits are completed in the now familiar manner to energize the print select magnets 40L of the lower printing section to effect printing of the data in the B field of Card VII.

It will thus be noted that a three line card (coded 12, 3), when followed by any card other than one coded 12, 4, will bring about interruption of card feeding for one cycle. This has the effect of causing printing from such following card to be spaced from the data derived from the three line card. Where card coded 12, 4 is present, this skipped cycle is omitted which, of course, also omits the incidental spacing so that printing from the 12, 4 card follows immediately after the printing from the three line card.

Fig. 20c in the sequence chart shows the additional operations for a single line card coded 12, 1 following and the operations controlled thereby will be apparent from the foregoing explanation.

Twelfth machine cycle

Assuming this to be the last card (Card VIII) of the group, it will cause energization of R121 and R122 in cycle 11 and in the first half of cycle 12 its A data will be read by brushes RB1 to control magnets 40U.

Since it is the last card, the card lever contacts CL1 open near the end of cycle 10 and R561 becomes deenergized in cycle 11. Also, card lever contacts CL2 open at the beginning of cycle 12 and related relay R562 opens in the second half of cycle 12, with relays R545 and R543 also being deenergized at the times indicated in Fig. 20c, so that the card feed ultimately stops at the end of cycle 13, after the last card has passed brushes RB3.

Zero print suppression

Provision is made for suppressing the printing of zeros to the left of significant digits, where this is desired. It is customary in perforated card accounting systems to punch zeros to the left of significant digits for the extent of a field. This is to insure that significant punches have not been inadvertently omitted. However, it is not desirable to have these filled in zeros appear in printed form. In the present machine, this provision is made only in connection with amounts that are printed from the upper print selecting mechanism.

Taking a specific example for purposes of illustration, let it be assumed that a field of a card is perforated to represent 000807. In the related orders of the print mechanism, plug connections 210 (Fig. 19b) will be made between plug sockets 211 extending to the 0 contacts of such orders and plug sockets 212 extending to normally open contacts designated a of R148. A plug connection is made from plug socket 211 related to the highest order position, through a plug connection 214 to a plug socket 215 designated "0" Elimination. As explained in connection with the mechanism described, the 0 contacts 185 are closed under control of the zero elimination bail 186 shortly after the 12 position on the card has been sensed by the first reading brushes RB1 and as indicated on the time chart (Fig. 15). Relay R148 is energized through contacts C44 for the period of closure of these contacts and during this period an impulse is transmitted from line 206, circuit breaker C5, contacts C69, socket 215, plug connection 214 to the highest order socket 211. Prior to transmission of this impulse in those positions in which zeros were sensed, the zero slide 63 (Fig. 11) will have been operated by the related interposer 62 which will have conditioned the mechanism to rock the related hook 91.

In accordance with the example chosen, the three highest orders will be so conditioned that the related zero contacts 185 will be closed and the impulse traced to socket 211 will now extend through the highest order 0 contacts 185 to the highest order print selecting magnet 40U and in parallel through the a contacts of R148 (shifted), plug connection 210, zero contacts 185 of the next lower order to the related print selecting magnet; with the circuit branching and continuing in parallel to the third highest position. The branching will terminate at the fourth highest zero contact 185 which will be open because of a setting for a significant digit.

This impulse transmitting to the three highest print selecting magnets will trip the slides 63 related to the interposers 4 and 5 which will in effect readjust the selecting mechanism to cause advance of the type bar an additional five steps in a plus direction, so that the type bar will move as seen in Fig. 17 from its −13 position to its −8 position, which latter position is blank.

There may also be cases where the zeros are not punched to the left of the significant figure, and in such cases the zero contacts 185 will close in these blank positions in the same manner as though zeros were present. The initial setting in the mechanism would have caused the bar to remain in its home or blank position or moved thereto from some prior position. The resultant tripping of the slides 63 in the 4 and 5 positions in response to impulses from contacts C69 will in this case also effect a change in the setting of five steps in a plus direction, which as seen from Fig. 17 will change the setting of the type bar from home or blank position to its +5 position, which is also blank.

It will, of course, be noted that the zeros to the right of the significant digit will be printed because the impulse to change the setting will not be transmitted through the zero contacts 185 to the magnets in lower orders.

*Asterisk printing*

It may be desirable in some cases to effect printing of asterisks to the left of the highest significant digit. Thus, for example, where a card may be punched in a field to represent 000807 or 807 without the left hand zeros, it may be desirable to effect the printing of ***807. This can be effected by connecting the highest order socket 211 to plug socket 216 through plug connection 217 made in place of the connection 214. Under the conditions of operation already explained, the impulse transmitted to the highest order socket 211 will now be timed by contacts C70 to energize the print selecting magnets 40U in those positions associated with blank positions or left hand zero positions. This timing is coordinated with the interposer operating cams so as to trip the hooks related to the interposers in the 2, 4 and 5 positions which would have the effect of adding 31 to the initial setting.

Specifically and referring to Fig. 17, the initial setting which would have positioned the bar at home or blank position for no designation in the column, will now change the setting so that it advances +31 steps to the asterisk designation present in this location of the type bar. If the initial selection had been made in response to the sensing of a 0 to position the bar in its −13 position, the added 31 will effect a reselection to bring it to its +18 position, in which there is also provided an asterisk printing type element.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a printing apparatus, a type carrier supported for reciprocation, operating mechanism connected thereto and including an element also mounted for reciprocation, a pair of reciprocable means drivingly connected to said element, means for moving with a phase relationship said reciprocable means in either direction from home positions and thereafter returning them thereto, so that the advance or positive stroke of one is concurrent with the return or negative stroke of the other, record controlled means for selectively controlling the direction and extent of advance of each reciprocating means from its home position, whereby the type carrier will be positioned in one direction or the other from home position at each half stroke an amount proportional to the algebraic sum of the movements of said pair of reciprocating means, and means for taking an impression from the type carrier at the termination of each half movement.

2. The invention set forth in claim 1, in which the total extent of movement of both reciprocating means is the same and the extent of record controlled advance to select a given character is also the same for each, whereby when successive record controlled selections are in accordance with the same character the element and connected type carrier remain in the position initially effected during repeated operation of the reciprocating means.

3. In a machine of the class described, a type carrier, a pair of character selecting devices for said carrier, each settable to represent a character to be printed, means for setting said devices, a set of interconnected levers for each selecting device, operating means therefor, means interconnecting the levers and said type carrier, each set including levers positioned under control of the related selecting device to move selected extents and in selected directions to act on the said interconnecting means accumulatively to position the carrier under control of said operating means in accordance with selected characters, and means for causing the operating means for the two sets of levers to operate in alternation to thereby cause the selecting devices to alternately operate their related sets of levers.

4. The invention set forth in claim 3 in which the operating means for each selecting device has a positioning and a restoring stroke, and in which the positioning stroke of each is concurrent with the restoring stroke of the other, said strokes being so coordinated that the carrier moves directly from character to character and further coordinated so that where the same character is repeatedly selected the carrier remains at its initial setting for such character.

References Cited in the file of this patent

UNITED STATES PATENTS

| Number | Name | Date |
|---|---|---|
| 1,997,167 | Bryce | Apr. 9, 1935 |
| 2,036,024 | Daly | Mar. 31, 1936 |
| 2,059,797 | Kirkegaard | Nov. 3, 1936 |
| 2,090,920 | Stuivenberg | Aug. 14, 1937 |
| 2,109,309 | Breitling | Feb. 22, 1938 |
| 2,290,827 | Thomas | July 21, 1942 |
| 2,413,883 | Mills | Jan. 7, 1947 |
| 2,557,092 | Sampson | Dec. 4, 1951 |